US009143461B2

(12) United States Patent
Jeyatharan et al.

(10) Patent No.: US 9,143,461 B2
(45) Date of Patent: Sep. 22, 2015

(54) COMMUNICATION DEVICE, NETWORK NODE, AND COMMUNICATION SERVER

(75) Inventors: Mohana Dhamayanthi Jeyatharan, Singapore (SG); Chan Wah Ng, Singapore (SG); Chun Keong Benjamin Lim, Singapore (SG); Keigo Aso, Kanagawa (JP); Takahisa Aoyama, Kanagawa (JP); Shinkichi Ikeda, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 253 days.

(21) Appl. No.: 13/643,637
(22) PCT Filed: Apr. 19, 2011
(86) PCT No.: PCT/JP2011/002264
§ 371 (c)(1), (2), (4) Date: Oct. 31, 2012
(87) PCT Pub. No.: WO2011/135800
PCT Pub. Date: Nov. 3, 2011

(65) Prior Publication Data
US 2013/0051326 A1   Feb. 28, 2013

(30) Foreign Application Priority Data

Apr. 30, 2010 (JP) ................................ 2010-105195

(51) Int. Cl.
*H04W 4/00* (2009.01)
*H04L 12/911* (2013.01)
(Continued)

(52) U.S. Cl.
CPC ............ *H04L 47/748* (2013.01); *H04L 47/245* (2013.01); *H04L 47/745* (2013.01); *H04L 47/805* (2013.01); *H04L 47/824* (2013.01); *H04W 4/005* (2013.01)

(58) Field of Classification Search
CPC ............. H04W 72/1242; H04W 4/005; H04L 87/805; H04L 47/748; H04L 47/245; H04L 47/745; H04L 47/824

USPC ......................................... 455/452.2; 725/90
See application file for complete search history.

(56) References Cited

U.S. PATENT DOCUMENTS

| 7,408,948 B2 | 8/2008 | Lopponen et al. |
| 7,609,634 B2 | 10/2009 | Chow |

(Continued)

FOREIGN PATENT DOCUMENTS

| JP | 2003-333050 A | 11/2003 |
| JP | 2004-356855 A | 12/2004 |
| JP | 2010-050550 A | 3/2010 |
| WO | 01/86863 A1 | 11/2001 |

OTHER PUBLICATIONS

3GPP TS 22.368 V2.0.0, "3rd Generation Partnership Project; Technical Specification Group Services and System Aspects; Service Requirements for Machine Type Communications", Mar. 2010, Release 10.

(Continued)

*Primary Examiner* — Thai Hoang
*Assistant Examiner* — Gbemileke Onamuti
(74) *Attorney, Agent, or Firm* — Pearne & Gordon LLP

(57) ABSTRACT

Disclosed is a technique for enabling a device that needs to send high priority and high bandwidth user plane traffic to send the user plane traffic even in the case where a group bandwidth has an upper limit in group-based communication. According to the technique, when an MTC device that is to send high priority and high bandwidth user plane traffic sends a service request to a network node (P-GW 213a), the network node allows use of a minimum bandwidth bearer in the case where the upper limit of the group bandwidth is exceeded. The MTC device sends a traffic sending request to an MTC server 214a via the bearer. The MTC server stops traffic of an appropriate other MTC device, to secure a bandwidth for the MTC device having the high priority and high bandwidth user plane traffic.

11 Claims, 12 Drawing Sheets

(51) Int. Cl.
*H04L 12/851* (2013.01)
*H04L 12/927* (2013.01)

(56) References Cited

U.S. PATENT DOCUMENTS

| | | | |
|---|---|---|---|
| 7,958,532 B2 * | 6/2011 | Paul et al. | 725/90 |
| 8,498,651 B2 * | 7/2013 | Livanos | 455/452.2 |
| 2004/0085959 A1 | 5/2004 | Ohkawa | |
| 2007/0258440 A1 | 11/2007 | Watanabe | |
| 2010/0130241 A1 * | 5/2010 | Kitaji | 455/509 |

OTHER PUBLICATIONS

3GPP TS 23.401 V9.3.0, "3rd Generation Partnership Project; Technical Specification Group Services and System Aspects; General Packet Radio Service (GPRS) enhancements for Evolved Universal Terrestrial Radio Access Network (E-UTRAN) access", Dec. 2009, Release 9.

International Search Report for Application No. PCT/JP2011/002264 dated May 31, 2011.

\* cited by examiner

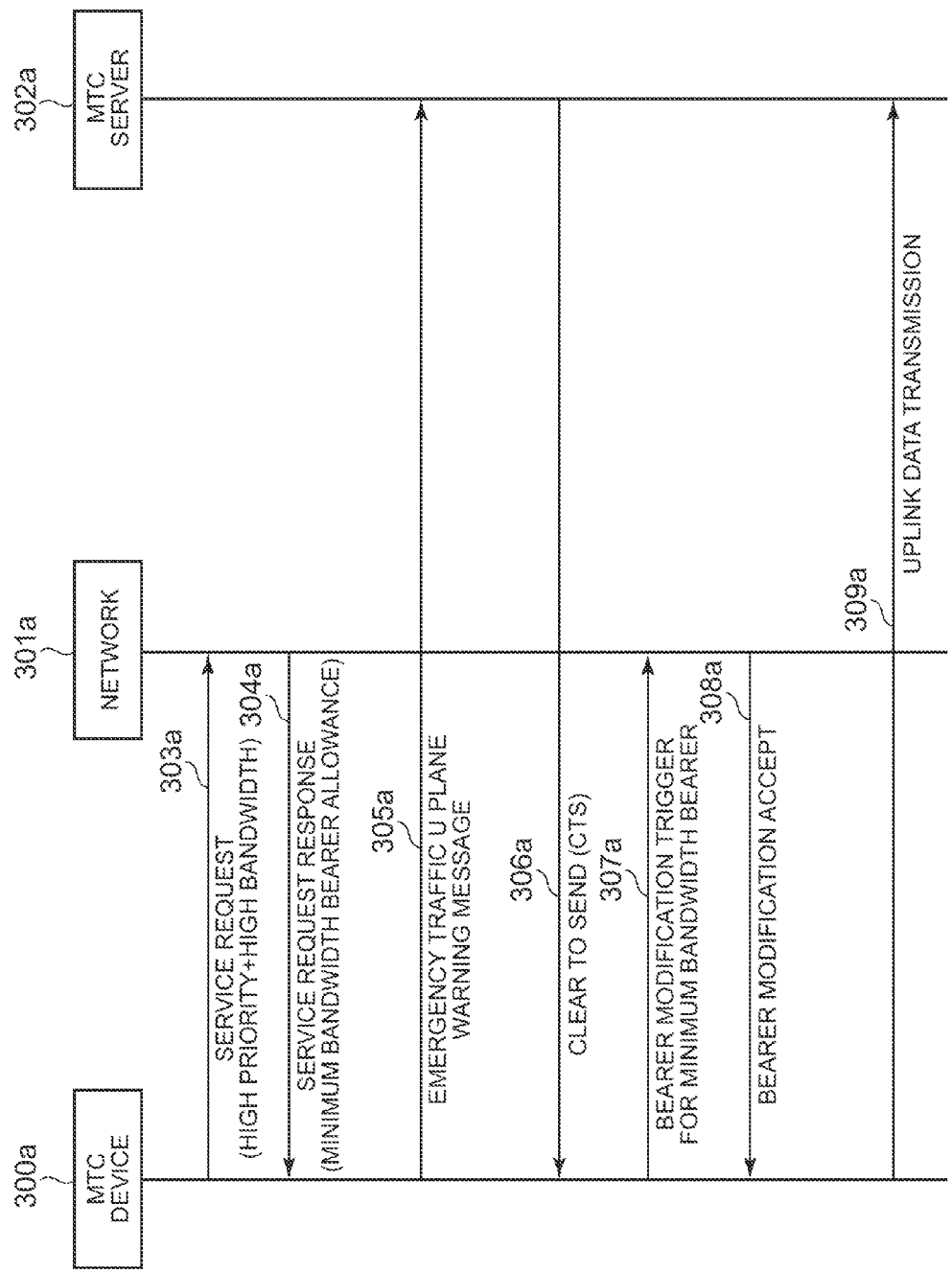

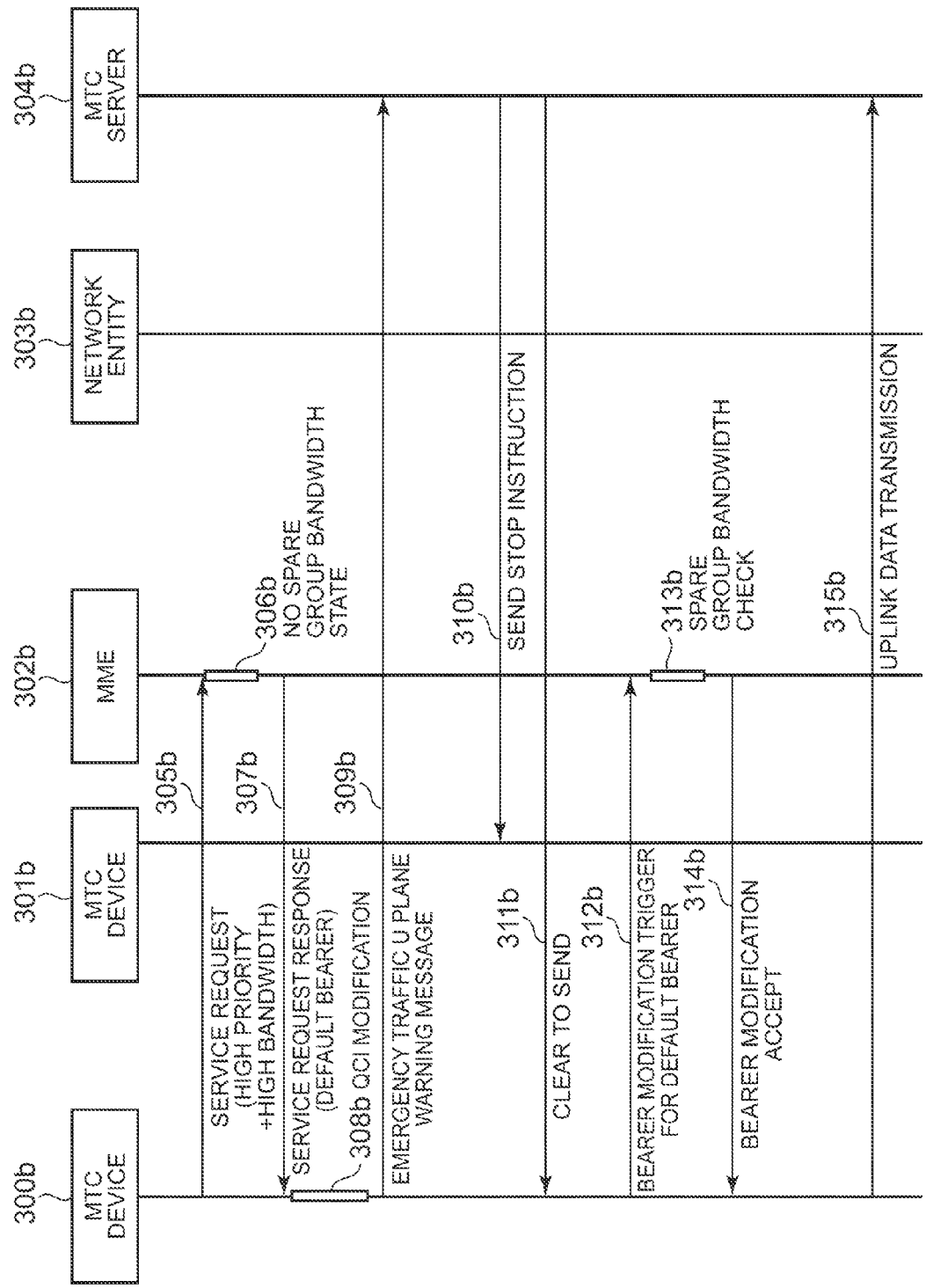

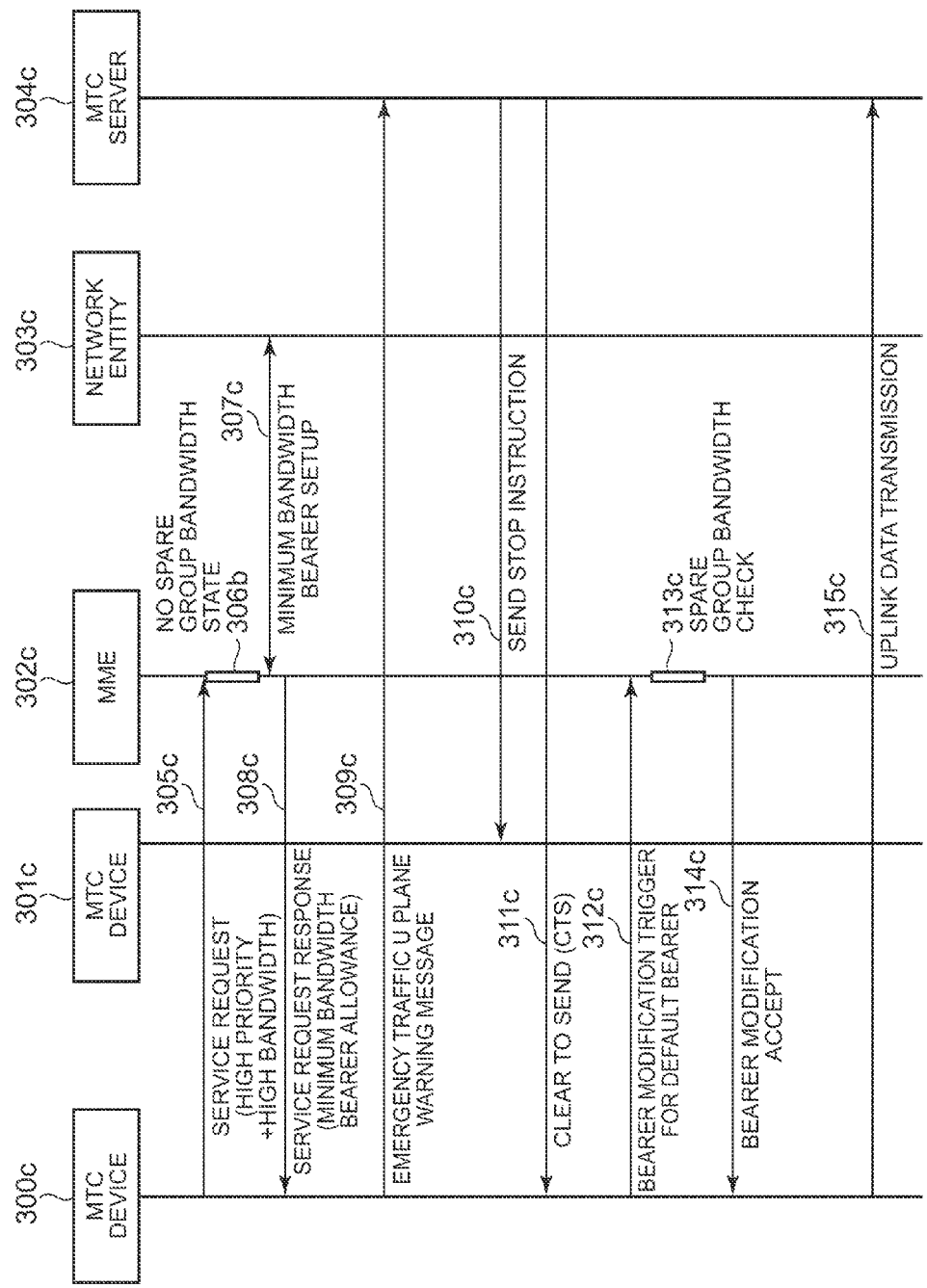

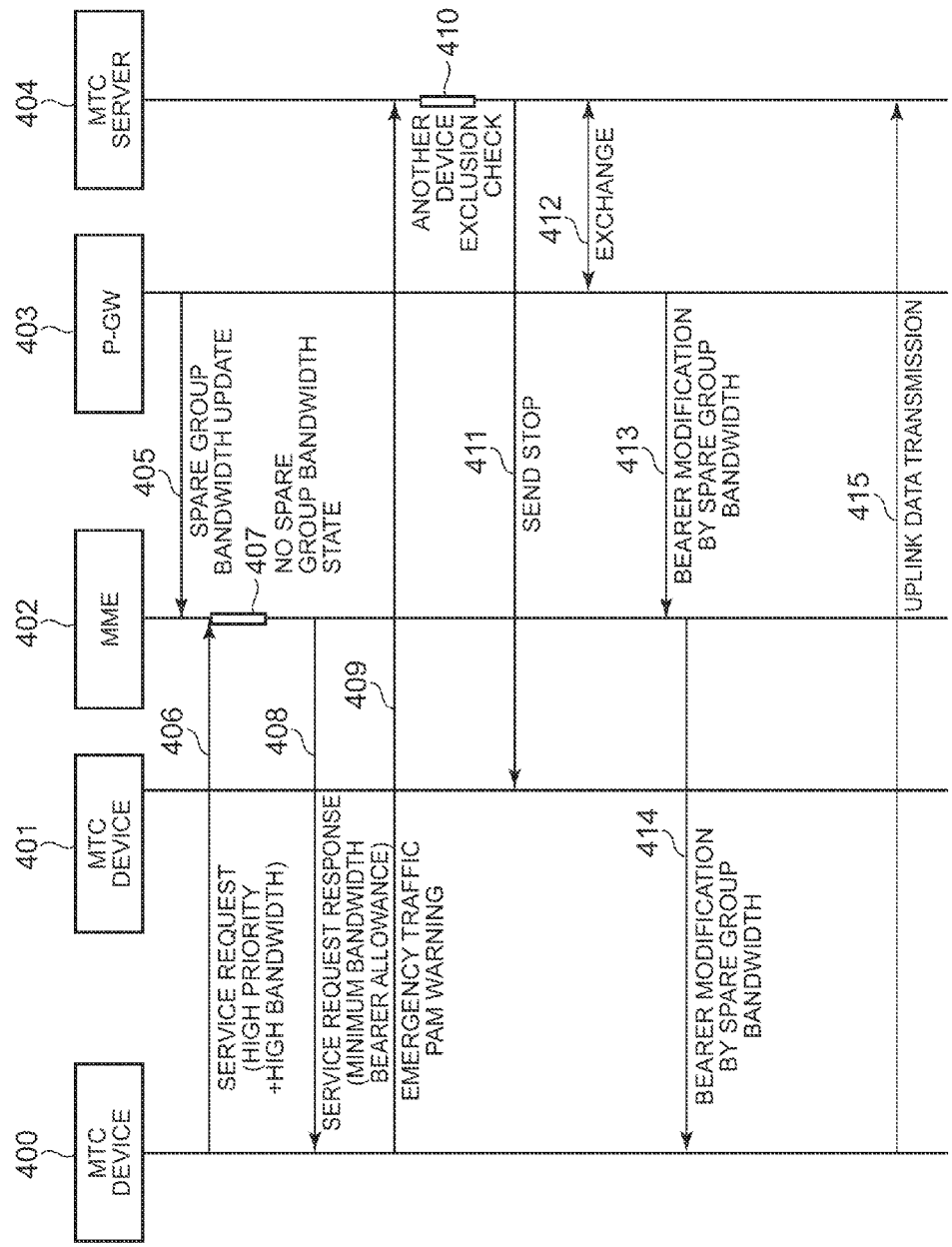

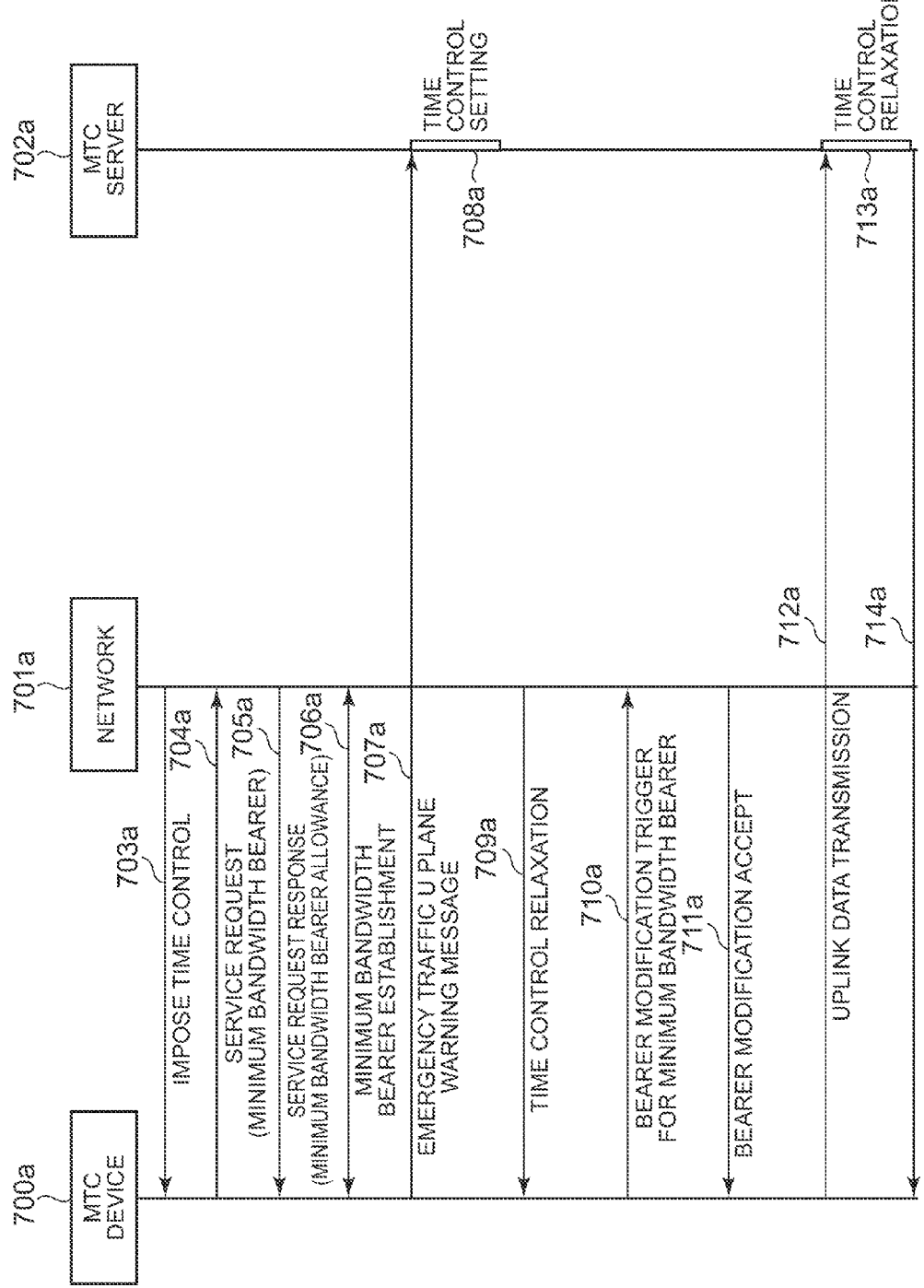

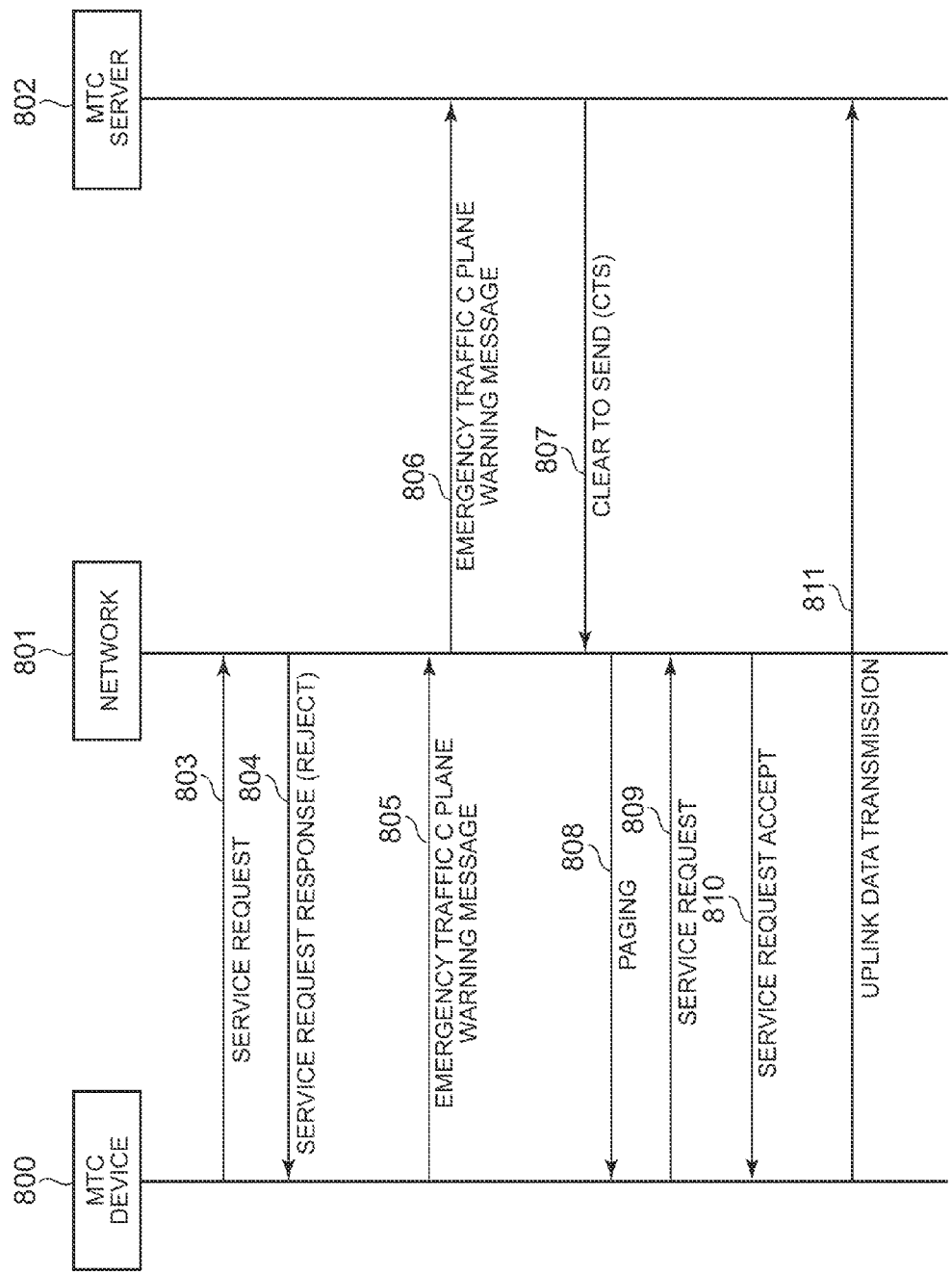

COMMUNICATION DEVICE, NETWORK NODE, AND COMMUNICATION SERVER

TECHNICAL FIELD

The present invention relates to a communication technique in a packet exchange-type data communication network. The present invention specifically relates to a communication device that belongs to a group and has a bandwidth constraint relating to a group bandwidth upper limit, a network node included in a network, and a communication server.

BACKGROUND ART

Cellular communications have continuously evolved from early days of GSM (Global System for Mobile Communications) networks to GPRS (General Packet Radio Service) and further to UMTS (Universal Mobile Telecommunications System) which is currently used worldwide. Next-generation LTE (Long Term Evolution) networks are expected to be available in the near future. Services provided by cellular communication networks have also been developed along with access technologies. Current cellular networks provide not only basic voice communication services but also transmission of short text messages and access to the global Internet. Recently, cellular networks have been extended to provide new services for covering non-human communication such as machine-to-machine (M2M) communication. 3GPP (Third Generation Partnership Project) has started to define requirements for supporting machine type communication by cellular networks (see Non-patent Document 1 listed below). This enables cellular networks to support machine type communication more appropriately.

M2M communication is a communication paradigm different from human-to-human (H2H) communication. M2M communication differs in communication scenario and communication model. Most machine type communication scenarios relate to communication between one or more MTC (Machine Type Communication) devices and one MTC server. Examples of a scenario in which an MTC device communicates with an MTC server include the following a) to g): a) a health care industry in which an MTC device updates human health-related data to an MTC server; b) route tracking in which a ship belonging to a company is tracked by a server using updated data sent from a moving ship equipped with an MTC device; c) an industry of monitoring possessions; d) a weather sensor for updating weather-related information to a server; e) a food sensor for updating food condition-related information to a server; f) a home smart meter for updating power outage or consumption-related information to an MTC server; and g) a surveillance camera for updating intruder detection information to an MTC server.

In addition to a scenario in which an MTC server communicates with an MTC server, there is also another MTC communication scenario such as communication between MTC devices. An example of such a communication scenario is that communication is performed between smart meters installed in a house, in order to control the MTC devices to improve operations. M2M communication has the following features different from H2H communication: a) operating without human involvement or determination process; b) having different communication traffic types such as data applications which have very low delay tolerance; c) having different communication models such as a type in which only mobile devices are present, a model in which polling is performed from a server for data acquisition, and a typical mobile type; d) having different mobility patterns to perform different location management operations on MTC devices such as a low mobility pattern and a non-mobility pattern; e) having different addressing mechanisms such as group-based addressing that enables a plurality of MTC devices to be reached using a single message; f) having a need to prevent theft or vandalism by MTC devices which are not human-controlled; g) having group-based charging and service provision models by a plurality of MTC devices placed under subscription of a service; and h) operating with minimum power consumption by making most MTC devices battery-driven without supply of power lines for less expensive operations. Such unique features specifically concerning M2M are used to specify service requirements and achieve network optimization. As the number of MTC devices connected to a 3GPP core network is much larger than the number of conventional user terminals (UEs) connected to 3GPP, network optimization targeting for the unique features of machine type communication is essential. This allows network operators to significantly reduce operation costs and provide attractive charging models for MTC devices.

Standardization has been made by the SA1 (Service & System Aspects 1) and SA2 (Service & System Aspects 2) working groups of 3GPP, to propose service and architecture requirements for providing network optimization specifically implemented with regard to the unique features of MTC devices. Service requirements and network optimization related to MTC devices are disclosed, for example, in Non-patent Document 1 listed below. Many of the MTC-related service requirements disclosed in Non-patent Document 1 are intended to optimize or improve networks for MTC communication. Non-patent Document 1 discloses a service requirement that a bandwidth upper limit is imposed on a group of MTC devices that belong to a single subscriber and communicate with an MTC server. Such a group bandwidth upper limit is hereafter referred to as a group aggregate maximum bit rate (group bandwidth maximum bit rate, G-AMBR). In Non-patent Document 1, all parameters about bandwidths are expressed in bits per second. The G-AMBR can be assigned independently for an uplink (UL) and/or a downlink (DL). An uplink G-AMBR is referred to as a UL-G-AMBR, and a downlink G-AMBR is referred to as a DL-G-AMBR. Only the UL-G-AMBR may be applied in an M2M group communication model in which user plane (U plane) traffic is mainly an uplink. Likewise, only the DL-G-AMBR may be applied in the case where a downlink is dominant. In the case where the G-AMBR is applied, a total bandwidth for user plane traffic by a large number of MTC devices belonging to the group can never exceed the G-AMBR When this group upper limit is exceeded, traffic shaping is performed at an enforcement point (bandwidth use status check point). In the above-mentioned group-based communication model, all MTC devices communicate with the same server and accordingly all MTC devices use the same packet data network gateway (P-GW), so that the traffic enforcement point is the P-GW. A primary motivation for assigning the G-AMBR is to set a smaller G-AMBR than a total bandwidth required when all MTC devices in the group simultaneously use the core network.

It is reasonable to assign the G-AMBR upper limit by the network in group-based communication. The use of the tightened group bandwidth upper limit contributes to lower service charges paid by the subscriber to the operator. Moreover, the operator can accommodate many MTC devices in the network, and earn more income by offering attractive prices. Typically, the G-AMBR is a static value assigned by a home subscription server (HSS), is statically stored in the P-GW, or provided from a policy control and charging related function (PCRF) to the P-GW by a static method. However, the G-AMBR may be a dynamic value dynamically manageable by the PCRF. Functional roles of the above-mentioned functional entities are described in detail in Non-patent Document 2 listed below.

By employing the concept of the G-AMBR, many advantages can be provided as described above. However, there are also tradeoffs, i.e. disadvantages. For example, due to the G-AMBR upper limit, a problem arises in the case where the bandwidth currently used among a plurality of MTC devices in the group has reached the G-AMBR but another MTC device in the group tries to send user plane traffic. Here, due to the G-AMBR upper limit, a problem also arises in the case where a plurality of MTC devices simultaneously seek a limitedly available bandwidth or a freely available bandwidth. The free bandwidth available in the group (hereafter denoted as AvGrBW) is equal to "(G-AMBR)−(current sum total of bandwidths or bit rates for MTC devices in the group sending U plane traffic)". The AvGrBW can be expressed in bits per second.

As summarized in Non-patent Document 2, according to normal UE operations, a QoS (Quality of Service) parameter associated with a default bearer is notified from a mobility management entity (MME) to a UE by a NAS (Non Access Stratum) message (Attach Accept message) during an initial attach procedure. In addition to a normal UE-directed bearer context notification procedure during the initial attach procedure, bearer context modification is notified to the UE using a bearer modification procedure when the UE is in a connected mode or an idle mode. The connected mode and the idle mode are defined in Non-patent Document 2. The bearer modification procedure can be triggered by the P-GW in most cases, but may also be triggered by the MME. It is clear from the above description of the normal UE procedures that the UE needs to recognize the bearer context beforehand and can thereby send uplink U plane traffic having appropriate properties and receive downlink U plane traffic. Besides, resource management and 3GPP EPS (Evolved Packet System) QoS models are not violated. For example, in the case where the network assigns a parameter related to a bandwidth to a bearer (e.g. dedicated bearer (individual bearer)), the UE needs to adjust the transmission rate of U plane traffic accordingly. In the case where the network assigns a maximum bandwidth (UE-AMBR) for all non-GBR (Guaranteed Bit Rate) flows of the UE or a maximum bandwidth (APN-AMBR) for all non-GBR flows of an access point name (APN) of the UE, the UE needs to ensure that the sum total of the bandwidths of the flows does not exceed the network-imposed upper limit. As an important advantage of recognizing the bearer properties beforehand, there is also an advantage that U plane traffic transmission can be speedily started when the UE transitions from the idle mode to the connected mode. This saves the wait time for the UE to recognize the bearer context before sending U plane traffic.

Bearer-related QoS parameters are, for example, QCI (Quality Class Indication), ARP (Allocation and Retention Priority), MBR (Maximum Bit Rate), GBR (Guaranteed Bit Rate), and the like. In addition to such QoS parameters, group QoS parameters for non-GBR bearers such as the UE-AMBR and the APN-AMBR are also assigned. Detailed description and definition of these QoS parameters are explicitly disclosed in Non-patent Document 2. A minimum necessary default bearer is created for every PDN (Packet Data Network) connection. The default bearer is assigned a minimum QoS parameter (QCI value needing a minimum QoS procedure). This bearer is normally a non-GBR bearer. Since the QoS parameters MBR and GBR relate only to GBR bearers, the QoS parameters MBR and GBR are not assigned to the default bearer. Moreover, a dedicated bearer is normally created by a P-GW initiated create bearer request procedure, as disclosed in Non-patent Document 2. The dedicated bearer may be a GBR bearer or a non-GBR bearer. When the dedicated bearer which is a GBR bearer is assigned by the network, the network guarantees the bit rate of the GBR bearer by using an appropriate resource reservation procedure in the radio access network (RAN) and the core network.

The network guarantees the bandwidth for the dedicated bearer but, in such a case where resources are unavailable, can always modify the GBR of the dedicated bearer. In current UE procedures, this dedicated bearer modification hardly occurs, and the dedicated bearer modification is notified to the UE beforehand. Likewise, the UE-AMBR and the APN-AMBR of the UE are hardly modified, and it is assumed that such information can be notified to the UE using a bearer modification procedure without QoS modification as described in Non-patent Document 2. For example, when the UE is in the idle mode, the bearer context modification is notified by initial paging, according to which the UE executes a service request procedure. Once the UE has succeeded in executing the service request, the modified bearer context is provided to the UE. However, since current UEs do not have low power requirements like MTC devices, no serious problem of power consumption arises even when paged and activated to receive the bearer modification. Besides, for normal UEs, the network has almost no need to concern about resource management. Since the bearer modification hardly occurs, the costs of paging and signaling associated with the paging are not very high. For example, the possibility that the UE-AMBR, the APN-AMBR, or the GBR for the dedicated bearer is modified is low. Regarding MTC devices, however, given that a large number of MTC devices are present, the network sends more bearer modification messages when there is a group bandwidth upper limit or a special technique for efficient resource management (technique employed in the network to accommodate M2M communication that requires an extremely large number of MTC device connections).

Patent Document 1 listed below discloses a method of reassigning a bandwidth from a first device to a second device in the case where the first device does not use the bandwidth. It is assumed here that the devices perform group communication. Patent Document 1 also discloses a method of achieving efficient bandwidth use by transferring a bandwidth which is not used in one device to another device.

Patent Document 2 listed below discloses a method of realizing a communication mechanism of a group communication model that allows only one device in a group to perform communication. In this method, a priority mechanism is covered by a method of using priority in initial access control. Interrupt priority for obtaining a higher priority device to be served is covered, too.

Patent Document 3 listed below discloses a method whereby communication priority is assigned to a terminal by an authentication server upon attachment. It is assumed that the assigned communication priority is notified from the authentication server to a router, and also the communication priority is appended to a packet sent from the terminal. Upon detecting the packet to which the communication priority is appended, the router processes the packet by a special method. The router also performs access control of a high priority terminal based on communication priority.

Patent Document 4 listed below discloses a method of appropriately addressing group devices. A transport network includes a flexible topology for internally defining transport elements. The transport elements each include a port group having a plurality of geographically distributed ports from the transport network. Point-to-multipoint connectivity is defined between the ports in a port group. An identifier represents the port group as a single element to internal and/or external elements for protocol exchanges.

PRIOR ART DOCUMENT

Patent Document

Patent Document 1: U.S. Pat. No. 7,609,634
Patent Document 2: U.S. Pat. No. 7,408,948
Patent Document 3: US Patent Publication No. 2007/0258440
Patent Document 4: International Patent Publication No. WO2001/086863

Non-Patent Document

Non-patent Document 1: 3GPP TS 22.368 V2.0.0, "Service Requirements for Machine Type Communications", March 2010
Non-patent Document 2: 3GPP TS 23.401 V9.3.0, "3rd Generation Partnership Project; Technical Specification Group Services and System Aspects; General Packet Radio Service (GPRS) enhancements for Evolved Universal Terrestrial Radio Access Network (E-UTRAN) access", December 2009

However, a problem arises in the case where the group bandwidth upper limit (i.e. G-AMBR) is imposed and the MTC device in the group has, as data to be sent, real time traffic, traffic needing a high bandwidth, or high priority U plane traffic. A main problem described here is based on a situation where the AvGrBW is insufficient to send high bandwidth traffic of the MTC device without delay tolerance (e.g. real time video capture information of high priority). When the G-AMBR is used as a group QoS parameter for the MTC device in the group model, the MTC device needs to recognize the AvGrBW related to the group. If the MTC device does not recognize this value, the MTC device is unable to properly perform uplink U plane traffic transmission. In the case where the MTC device has real time U plane traffic (e.g. real time video) to be sent, the MTC device needs to ensure that the transmission rate of the U plane traffic is lower than the AvGrBW. In the case where the MTC device has traffic with delay tolerance that may be rate-controlled (e.g. data traffic transmittable at an arbitrary transmission rate), the MTC device needs to recognize the AvGrBW so as to modify the application traffic rate according to the AvGrBW.

The above-mentioned problem is further described below, with reference to FIG. 1. MTC devices 103, 104, 105, and 106 subscribe to a group and, in most cases, communicate with an MTC server 102 via a core network (3GPP EPC) 100. In the case where one of the MTC devices (e.g. the MTC device 106) communicates with the MTC server 102, a P-GW 101 monitors a U plane uplink traffic rate, and recognizes a bandwidth for the MTC device 106. In FIG. 1, uplink U plane traffic from the MTC device 106 is shown by a message 110. Having calculated the AvGrBW which is "(UL-G-AMBR)-(rate of uplink U plane traffic from the MTC device 106)", the P-GW 101 notifies the AvGrBW to the MTC devices 103, 104, 105, and 106 using a bearer modification procedure without bearer QoS update. The bearer modification procedure without bearer QoS update is typically used when modifying a traffic flow template (TFT) and/or the APN-AMBR, as disclosed in Non-patent Document 2. Bearer modification procedure-related signaling sent to the MTC devices 103, 104, and 105 is shown by signaling messages 107, 108, and 109, respectively. If only the MTC device 103 is scheduled to send uplink U plane traffic to the MTC server 102, the bearer modification signaling to the MTC devices 104 and 105 is needless signaling. In the M2M structure and operation, signaling overhead occurs, and therefore the addition of the bearer modification signaling shown by the signaling messages 108 and 109 is undesirable. In the case where there are many MTC devices in the group which do not need the information sent by the bearer modification signaling for notifying the AvGrBW, the bearer modification signaling causes a waste of resources in the core network.

Besides, the MTC devices shown in FIG. 1 are low-power devices, and unnecessarily activating the MTC devices 104 and 105 to update the AvGrBW causes a waste of power of the MTC devices having limited power supply. Suppose, in the scenario shown in FIG. 1, after a predetermined time the MTC device 103 has uplink U plane traffic to be sent. The traffic of the MTC device 103 is high priority, high bandwidth, real time traffic that can neither be delayed nor rate-controlled. Also suppose the AvGrBW notified to the MTC device 103 cannot support the bit rate required by the MTC device 103. Since the AvGrBW is insufficient, the high priority, high bandwidth, real time traffic does not reach the MTC server 102. For example, the MTC devices 103, 104, 105, and 106 may be surveillance cameras installed in various regions across different eNB service areas. This being the case, there is a possibility that the MTC device 103 sends important information about intrusion of an intruder. Such an important message needs to be sent in real time, and also requires a high bandwidth in order to clearly capture the intruder's posture and motion. Thus, it is essential that the U plane traffic from the MTC device 103 can reach the MTC server 102 with no delay in the model in which the group bandwidth upper limit is set. Though the problem of the group-based communication scenario including MTC devices is described here, a person skilled in the art will understand that the problem can occur in any type of group-based communication.

The technique disclosed in Patent Document 1 is not a technique of obtaining an available bandwidth for high bandwidth traffic transmission in the case where there is no spare bandwidth. Accordingly, for example in such a case where the AvGrBW is set to a minimum necessary state, the unused bandwidth reassignment method cannot be used to solve the problem associated with high priority traffic transmission described with reference to FIG. 1.

The technique disclosed in Patent Document 2 does not address how to obtain a bandwidth for a high priority device in the case where static priority is not assigned to each device in the group. Thus, in the case where priority is not assigned to each device in the group beforehand, the technique disclosed in Patent Document 2 cannot appropriately specify a high priority device to be served, and so cannot appropriately solve the problem described with reference to FIG. 1.

The technique disclosed in Patent Document 3 does not include an access control mechanism in the case where terminal priority is set based on a time of traffic sent from a terminal. In the case where a network entity assigns static priority to each device beforehand as disclosed in Patent Document 3, the problem when no priority state is explicitly assigned by the network as in the scenario of FIG. 1 cannot be solved. Besides, Patent Document 3 does not cover how high priority traffic is accommodated in the case where the bandwidth upper limit is imposed (the case shown in FIG. 1).

The technique disclosed in Patent Document 4 includes a group identifier which is an appropriate mechanism for achieving group optimization in the case where communication traffic is sent to a plurality of devices, but cannot realize a method of obtaining high priority traffic via the network in order to solve the problem described with reference to FIG. 1.

SUMMARY OF THE INVENTION

To solve the problem described above, the present invention has an object of enabling a necessary bandwidth to be obtained within a group bandwidth upper limit even in the case where, when there is a group device having high priority, high bandwidth, real time user plane traffic, an available group bandwidth is insufficient to send the user plane traffic. The present invention also has an object of enabling a necessary bandwidth to be obtained by a device while minimizing power consumption by preventing excess signaling from the device to a network.

To achieve the stated objects, a communication device according to the present invention is a communication device in a system in which a plurality of communication devices communicate with a specific communication server via a network and a sum total of communication bit rates assigned to the plurality of communication devices is not to exceed a predetermined upper limit, the communication device comprising: a sending determination unit configured to determine whether or not to send high priority and high bit rate traffic; a service request sending unit configured to send, to the network, a service request for sending the high priority and high bit rate traffic, in the case where the high priority and high bit rate traffic is determined to be sent; a service request response reception unit configured to receive a service request response that is a response to the service request and includes a bearer identifier of a bearer via which the high priority and high bit rate traffic is unable to be sent; a traffic sending request unit configured to send a traffic sending request for the high priority and high bit rate traffic, to the specific communication server via the bearer identified by the bearer identifier; a traffic sending request response reception unit configured to receive a sending request response that is a response to the traffic sending request and includes information indicating whether or not the high priority and high bit rate traffic is able to be sent; and a traffic sending unit configured to send the high priority and high bit rate traffic to the specific communication server, in the case where the high priority and high bit rate traffic is determined to be able to be sent from the sending request response.

According to this structure, a necessary bandwidth can be obtained within a group bandwidth upper limit even in the case where, when there is a group device having high priority, high bandwidth, real time user plane traffic, an available group bandwidth is insufficient to send the user plane traffic. In addition, according to this structure, a necessary bandwidth can be obtained by a device while minimizing power consumption by preventing excess signaling from the device to a network.

Moreover, to achieve the stated objects, a network node according to the present invention is a network node included in a network in a system in which a plurality of communication devices communicate with a specific communication server via the network and a sum total of communication bit rates assigned to the plurality of communication devices is not to exceed a predetermined upper limit, the network node comprising: a service request reception unit configured to receive, from a communication device that determines to send high priority and high bit rate traffic, a service request for sending the high priority and high bit rate traffic; and a service request response sending unit configured to send a service request response including a bearer identifier of a bearer via which the high priority and high bit rate traffic is unable to be sent, as a response to the service request.

According to this structure, a necessary bandwidth can be obtained within a group bandwidth upper limit even in the case where, when there is a group device having high priority, high bandwidth, real time user plane traffic, an available group bandwidth is insufficient to send the user plane traffic. In addition, according to this structure, a necessary bandwidth can be obtained by a device while minimizing power consumption by preventing excess signaling from the device to a network.

Moreover, to achieve the stated objects, a communication server according to the present invention is a communication server in a system in which a plurality of communication devices communicate with the communication server via a network and a sum total of communication bit rates assigned to the plurality of communication devices is not to exceed a predetermined upper limit, the communication server comprising: a traffic sending request reception unit configured to receive, from a communication device that determines to send high priority and high bit rate traffic, a traffic sending request for the high priority and high bit rate traffic, via a predetermined bearer; a traffic stop instruction unit configured to send a traffic stop instruction to a specific communication device that is able to stop sending traffic, from among communication devices other than the communication device that determines to send the high priority and high bit rate traffic; and a traffic sending request response sending unit configured to reserve, for the high priority and high bit rate traffic of the communication device that determines to send the high priority and high bit rate traffic, a bandwidth assigned to the specific communication device that has stopped sending the traffic by the traffic stop instruction unit, and send a sending request response that is a response to the traffic sending request and includes information indicating that the high priority and high bit rate traffic is able to be sent.

According to this structure, a necessary bandwidth can be obtained within a group bandwidth upper limit even in the case where, when there is a group device having high priority, high bandwidth, real time user plane traffic, an available group bandwidth is insufficient to send the user plane traffic. In addition, according to this structure, a necessary bandwidth can be obtained by a device while minimizing power consumption by preventing excess signaling from the device to a network.

The present invention having the structures described above has an advantageous effect of enabling a necessary bandwidth to be obtained within a group bandwidth upper limit even in the case where, when there is a group device having high priority, high bandwidth, real time user plane traffic, an available group bandwidth is insufficient to send the user plane traffic. The present invention also has an advantageous effect of enabling a necessary bandwidth to be obtained by a device while minimizing power consumption by preventing excess signaling from the device to a network.

BRIEF DESCRIPTION OF THE DRAWINGS

FIG. 3A is a sequence chart showing a second example of an operation in an embodiment of the present invention.

FIG. 3B is a sequence chart showing a third example of an operation in an embodiment of the present invention.

FIG. 3C is a sequence chart showing a fourth example of an operation in an embodiment of the present invention.

FIG. 4 is a sequence chart showing a fifth example of an operation in an embodiment of the present invention.

FIG. 7B is a sequence chart showing a sixth example of an operation in an embodiment of the present invention.

FIG. 8 is a sequence chart showing a seventh example of an operation in an embodiment of the present invention.

DESCRIPTION OF EMBODIMENTS

<Basic Principle of the Present Invention>

Figure 1:
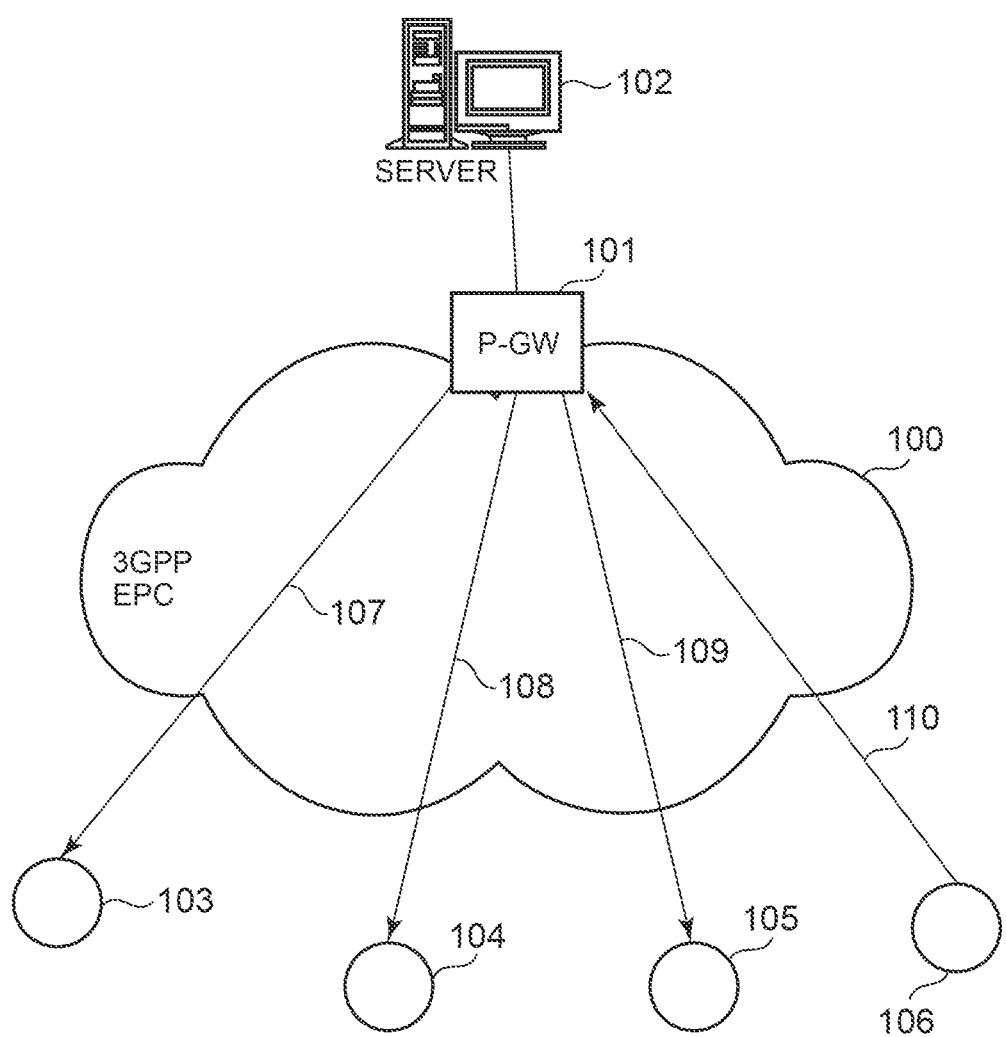
FIG. 1 is a diagram showing a group-based communication model in conventional art.

The present invention is applied in the case where a mobile device group (e.g. an MTC device group) performs group communication with one or more servers (e.g. an MTC server) and there is no group bit rate or group bandwidth available for high priority, high bandwidth, real time U plane traffic of a predetermined device in the group. A basic principle of the present invention is that such a device having high priority U plane traffic notifies the traffic state using a signaling procedure to a network and, in the case where there is no available group bandwidth in the network, obtains a bearer having a minimum bandwidth. After obtaining the minimum bandwidth bearer, the device notifies a critical state (i.e. the device is unable to send the high priority U plane traffic) to the server, as a result of which the server stops transmission by another device in the group that is not sending important U plane traffic, to obtain a group bandwidth available to the device having the high priority U plane traffic.

That is, steps or processes relating to the main principle of the present invention are as follows.

A device in a group determines its priority state relating to traffic of an application layer, and notifies transmission of high priority U plane traffic to a network.

The device further notifies a U plane traffic state and a state of not having an available group bandwidth to a server, using a minimum bandwidth bearer provided from the network (3GPP network).

To stop transmission by a device having low priority U plane traffic so as to secure a bandwidth for the device having the high priority U plane traffic and requesting a bandwidth, the server specifies, using intelligence of the application layer, a U plane traffic state of another device in the group, and releases a band used for low priority U plane traffic.

Lastly, the device having the high priority U plane traffic receives the notification that the group bandwidth necessary for the high priority U plane traffic becomes available, to enable the high priority U plane traffic to be transferred without a significant delay.

<Operation Scenario of the Present Invention>

The following describes an operation scenario of the present invention according to a preferred embodiment of the present invention in detail. An operation scenario that especially relates to a 3GPP structure is described below, with reference to FIG. 2A. It should be, however, apparent to a person skilled in the art that the present invention is not limited to a 3GPP-specific scenario but is equally applicable to other operation scenarios. For example, devices can perform group communication with a server through a broadband access medium or any other type of access medium or network architecture. The present invention is also applicable in the case where one device in a group functions as a server in a group-based communication model. Though the scenario shown in FIG. 2A concerns MTC devices communicating with an MTC server, there is no constraint on the type of devices to which the present invention is applied. For example, the devices may be ordinary mobile terminals having a function of connecting to a network to receive a service.

Figure 2A:
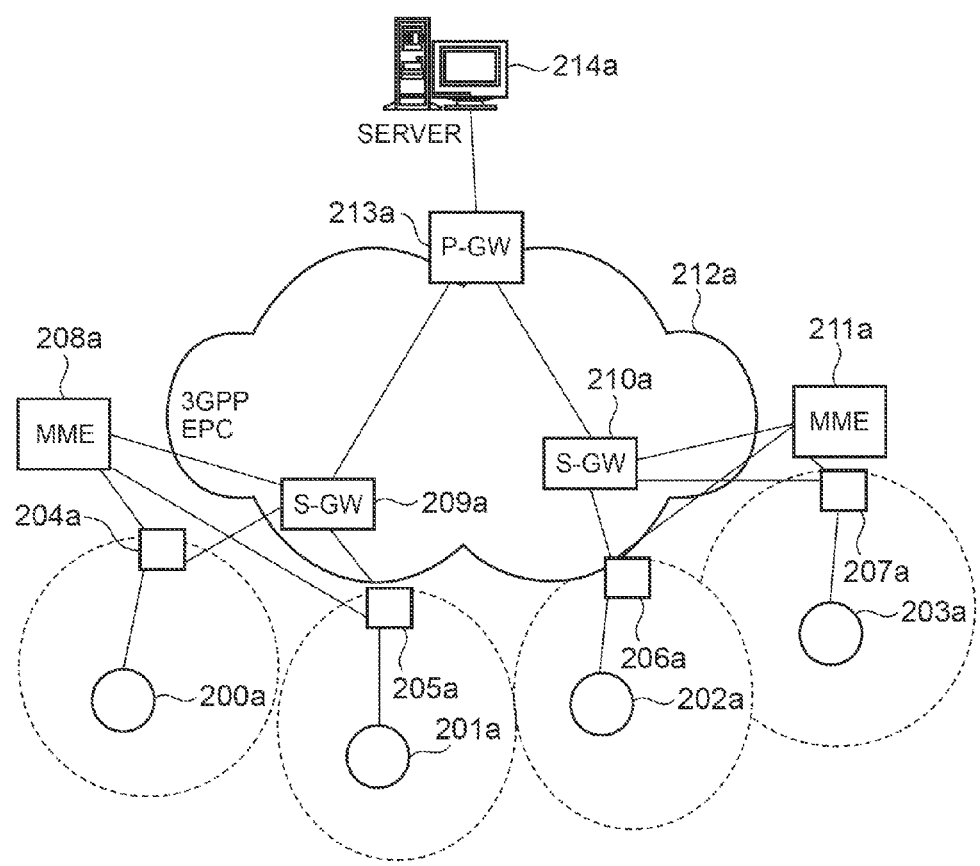
FIG. 2A is a diagram showing an example of a structure of a group-based communication model in an embodiment of the present invention.

In FIG. 2A, MTC devices 200a, 201a, 202a, and 203a use group-based communication with a server such as an MTC server 214a. The MTC devices 200a, 201a, 202a, and 203a use a 3GPP core network 212a for user plane and control plane traffic transmission to a relevant end point. User plane traffic of the MTC devices 200a, 201a, 202a, and 203a shown in FIG. 2A reaches the MTC server 214a through a tunneling mechanism from an eNB to a serving gateway (S-GW) and another independent tunneling mechanism from the S-GW to a P-GW. The 3GPP core network 212a shown in FIG. 2A may be a 3GPP evolved packet core (EPC) described in Non-patent Document 2. Alternatively, the core network 212a may be a GPRS (General Packet Radio Service) core network or a UMTS (Universal Mobile Telecommunication System) core network, to which the present invention is equally applicable. Though FIG. 2A shows the structure in the case of employing LTE as the access system, the eNB is replaced with RNC/BSC, the MME is replaced with SGSN, and the P-GW is replaced with GGSN in the case of employing UMTS.

The MTC devices 200a, 201a, 202a, and 203a shown in FIG. 2A are installed by a single subscriber in independent regions that do not overlap with each other (or only partially overlap with each other). Installing the MTC devices in the independent regions means that the MTC devices are each placed in an independent eNB service area or cell. Such placement is most realistic. This is because, in most cases, the MTC devices are used to send information from different regions, rather than being placed in the same region. In a rare situation where a large number of pieces of machine type data need to be detected in a region, a plurality of MTC devices may be placed in a predetermined location for load balancing between MTC devices. However, given that the MTC devices usually do not have a large amount of data to be sent, it is realistic to place the MTC devices in independent non-overlapping regions for data collection, processing, and transmission to the MTC server.

Based on such a placement model where the MTC devices do not overlap, the MTC devices 200a, 201a, 202a, and 203a are connected respectively to eNBs 204a, 205a, 206a, and 207a, as shown in FIG. 2A. When the MTC devices 200a and 201a send a NAS message (tracking area update, service request) to an MME 208a, the eNBs 204a and 205a set up a S1 control plane connection (S1-MME, S1-AP (Application Protocol)) with the MME 208a respectively for the MTC devices 200a and 201a. Likewise, when the MTC devices 200a and 201a transition from the idle mode to the connected mode and execute a service request mechanism, an S-GW 209a, upon instructed by the MME 208a, sets up a S1 user plane connection (S1-u, GPRS tunneling protocol (GTP) bearer) with the eNBs 204a and 205a respectively for the MTC devices 200a and 201a. Operation mechanisms for service requests and typical NAS signaling are described in detail in Non-patent Document 2. Appropriate bearers to an MME 211*a* and an S-GW 210*a* are also set up for the MTC devices 202*a* and 203*a* by the same method. Moreover, a GTP bearer or a PMIP tunnel from the S-GW 209*a* to the P-GW 213*a* is set up for the MTC devices 200*a* and 201*a*, and equally a GTP bearer or a PMIP tunnel from the S-GW 210*a* to the P-GW 213*a* is set up for the MTC devices 202*a* and 203*a*.

As shown in FIG. 2A, when the MTC devices are placed without overlap in the 3GPP network, there is a possibility that MTC devices in a group are connected to and managed by different eNBs, MMEs, or S-GWs. However, since all MTC devices communicate with the single MTC server 214*a*, the same P-GW 213*a* can be assigned according to a static configuration stored in an HSS. The P-GW 213*a* is an entity for recognizing a communication status for the G-AMBR upper limit (G-AMBR enforcement point), a point for calculating the AvGrBW, and an entity for notifying or distributing AvGrBW information.

The operation scenario shown in FIG. 2A relates to a situation where all MTC devices in the group are connected to different eNBs and so have a possibility of being connected to and managed by different MMEs and S-GWs. However, the present invention is equally applicable to a scenario in which all MTC devices that communicate with the MTC server in the group-based communication model are connectable to the same eNB, the same MME, or the same S-GW. In this scenario, the G-AMBR enforcement point may be the S-GW instead of the P-GW. In the case where the S-GW preserves the G-AMBR, however, a new procedure for triggering a bearer modification procedure so that the AvGrBW can be notified to the MTC devices needs to be introduced to the S-GW.

<Scenario Examples to which the Present Invention is Applicable>

The following describes appropriate scenario examples of the present invention, according to the preferred embodiment of the present invention. The present invention is applicable to a practical reality scenario in which a device having such a group-based bandwidth limitation needs to send high priority, high bandwidth, real time U plane traffic to a server. The present invention is particularly applicable in the case where a device in a group has high priority U plane traffic to be sent to a server in a state where a group bandwidth is limited, while some other devices in the group are not sending high priority U plane traffic to the server. Though this embodiment of the present invention concerns an M2M group-based communication scenario, the present invention is also applicable to many other non-M2M scenarios without departing from the scope of the present invention.

An M2M group-based communication scenario to which the present invention is applicable is, for example, that an MTC subscriber arranges a plurality of MTC devices for obtaining images of theft or vandalism in a house or an office using surveillance cameras. In this arrangement scenario, the surveillance cameras update monitored events to a common MTC server, for theft prevention and detection. The surveillance cameras having an MTC function are limited in power, and may be battery-driven. It is assumed here that all surveillance cameras in the group do not simultaneously send the same type of U plane traffic to the MTC server. For example, when detecting an intruder, a surveillance camera needs a high bandwidth in order to send, to the server, high priority U plane traffic obtained by capturing the intruder's face, behavior, and motion at a high resolution. There may be an instance where a predetermined surveillance camera tries to send high priority U plane traffic to the MTC server, while another surveillance camera in the group is sending normal traffic obtained by capturing normal home or office activity to the MTC server. Thus, the present invention is applicable to obtain a minimum bandwidth bearer for the surveillance camera that tries to send high priority U plane traffic but does not currently have a sufficient bandwidth. Having obtained the minimum bandwidth bearer for notifying to the MTC server the state that the available group bandwidth is insufficient, the surveillance camera sends a warning message via the minimum bandwidth bearer, thereby notifying the state to the MTC server. Upon receiving the information of the insufficient bandwidth from the surveillance camera, the MTC server cancels the session of the other low priority camera, assigns a bandwidth to the high priority surveillance camera, and notifies to the high priority surveillance camera to start the service.

Another M2M group-based communication scenario to which the present invention is applicable is, for example, that MTC devices having a camera function are arranged so as to capture real time events and report them to an MTC server for entertainment. For instance, these MTC devices operate to capture events in real time without human involvement, and send the events to the MTC server installed in a television broadcast station through the use of multimedia traffic.

Another M2M group-based communication scenario to which the present invention is applicable is, for example, that MTC devices in a group update traffic about human health conditions to an MTC server. Streams of traffic from the MTC devices may include, for example, human heartbeats, body temperatures, and blood sugar levels. In such a case, if the group bandwidth upper limit is imposed on each MTC device for health monitoring in the group, it is desirable to allow access for high priority U plane traffic from the MTC device for heath monitoring, according to the primary method of the present invention. The method of the present invention can be applied to enable transmission of high priority U plane traffic from the health monitoring device without a significant delay.

<Bearer Procedure by the G-AMBR Enforcement Point>

The following describes a bearer management execution method when the G-AMBR is enforced and implemented in a core network in the case where MTC devices perform group-based communication with an MTC server and each MTC device is assigned one or more bearers, according to the preferred embodiment of the present invention. Typical bearer management for normal UEs is disclosed, for example, in Non-patent Document 2. In this description, however, a bearer management procedure in the case where the G-AMBR upper limit is set is described. Though the bearer management in the case where the G-AMBR is present in a M2M communication scenario is described below, a person skilled in the art will understand that the present invention is applicable to any group-based communication scenario in which one or more bearers are created for a device and the G-AMBR is configured and implemented in a system.

For example, if only a default bearer is established for a predetermined MTC device in the group, upon being notified that an available group bandwidth (i.e. uplink AvGrBW) is 0, the MTC device cannot send U plane uplink traffic. Since the default bearer is a non-GBR bearer, the MTC device can send the U plane uplink traffic in the case where the notified available group bandwidth is more than 0. Moreover, whenever the AvGrBW is changed, the available group bandwidth state is notified to the MTC device using a bearer modification procedure without bearer QoS update. The same procedure described with regard to a single default bearer also applies in the case where there are a plurality of PDN connections for the MTC device and the MTC device has a plurality of default bearers. Even in the case where a plurality of default bearers are present, the AvGrBW is notified not using bearer QoS update signaling but using a single bearer modification procedure. This is because the AvGrBW is not a parameter related to a predetermined default bearer but a parameter related to the MTC device.

For example, in the case where the predetermined MTC device in the group has a dedicated bearer and a default bearer and each dedicated bearer is a non-GBR bearer, the AvGrBW may be notified to the MTC device irrespective of the predetermined bearer or bearer ID. That is, the AvGrBW is notified using a single bearer modification procedure without bearer QoS update. Even in the case where a plurality of non-GBR bearers are present, single bearer modification signaling is used to provide the AvGrBW to the MTC device. This is because all bearers are non-GBR bearers with no related bandwidth, and therefore the network merely notifies the AvGrBW not associated with the bearer identifier. In such a case, the MTC device sends the uplink U plane traffic when the AvGrBW is more than 0, and does not send the uplink U plane traffic when the AvGrBW is 0. Upon being notified that the AvGrBW is more than 0, the MTC device in the group can send the U plane traffic using any of the non-GBR dedicated bearer or the default bearer.

In another scenario in which, as an example, the predetermined MTC device in the group has a default bearer and a GBR bearer, the AvGrBW is notified in such a manner that the P-GW sends bearer modification signaling independently for each dedicated (GBR) bearer to notify a bandwidth modified for each GBR bearer. That is, since the bandwidth relates to the GBR bearer, the network divides the AvGrBW between the GBR bearers and as a result sends bearer modification signaling for each bearer. Suppose the AvGrBW is x. To symmetrically or asymmetrically distribute most of the available bandwidth to the GBR bearers, the P-GW executes a plurality of bearer modification procedures for each GBR bearer. Thus, in the case where GBR bearers are present, it is necessary to distribute or allocate the AvGrBW between the GBR bearers, which leads to an increase in bearer modification signaling. On the other hand, in the case of a plurality of non-GBR bearers, single bearer modification signaling for notifying the AvGrBW is sufficient. Besides, the procedure when sending bearer modification signaling for the GBR bearer differs from the bearer modification procedure without bearer QoS update. Regarding the GBR bearer, bearer modification signaling sends the bandwidth (GBR value) for the bearer, and so the procedure is a bearer modification procedure with QoS update as disclosed in Non-patent Document 2. Moreover, since there is no GBR for the default bearer, only a minimum bandwidth is left for the default bearer. When a new GBR value is notified to the MTC device, the MTC device determines whether or not the GBR value is sufficient to send the traffic, and selects the related GBR bearer or default bearer.

In the case where the bearers assigned to the predetermined MTC device are a default bearer, a GBR dedicated bearer, a non-GBR dedicated bearer, and the like, the P-GW assigns the available group bandwidth, i.e. most of the AvGrBW, to the GBR bearer and notifies this to the MTC device, while assigning a minimum bandwidth in the AvGrBW to the default bearer and the non-GBR bearer. The P-GW executes a plurality of bearer QoS modification procedures for the GBR bearer, and notifies a bandwidth assigned to each GBR bearer. For the default bearer and the non-GBR bearer, the P-GW executes a single bearer modification procedure without bearer QoS update, and notifies an available bandwidth for the default bearer and the non-GBR bearer altogether. The MTC device can then send the traffic via one or more non-GBR bearers, using the available bandwidth sent by the bearer modification procedure without bearer QoS update. Likewise, when selecting the related GBR bearer for uplink traffic transmission, the MTC device uses the received bearer QoS update for each individual GBR bearer.

Even if the MTC device has the GBR bearer with the guaranteed bandwidth at the time of U plane traffic transmission, the bandwidth of the GBR bearer unused for U plane traffic is not used as a bandwidth in the AvGrBW calculation. For example, when calculating the available group bandwidth or the AvGrBW, the total bandwidth used in the MTC device group is specified in the first step. This bandwidth is a bandwidth related to U plane traffic of the MTC devices. After the bandwidth used in the group is specified, the available group bandwidth can be specified. When calculating the used bandwidth, only the bandwidths related to actual U plane traffic are included in the used bandwidth, while the bandwidths related to unused GBR bearers are not included in the used bandwidth. The unused GBR bearers are GBR bearers via which no U plane traffic is currently sent.

In another communication model, on the other hand, the GBR bearers are considered as high priority bearers, and it is possible to use these GBR bearers for calculating the bandwidth used in the group even in the case where no U plane traffic is currently sent via the GBR bearers. Through the use of such a procedure, the GBR bearer-related bandwidth is always available to the MTC device for which GBR bearers are allowed, regardless of whether or not U plane traffic is sent via the GBR bearers. However, always reserving the fixed bandwidth for each GBR bearer cannot constitute an efficient resource management model. Nevertheless, in some scenario, the MTC device can request the network to establish a special dedicated GBR bearer having a bandwidth that is always indicated to be available, in the available group bandwidth calculation. By possessing such a bearer, the MTC device can immediately use the special dedicated GBR bearer for high priority traffic transmission, without a need to take the AvGrBW into consideration.

Though the above describes the QoS bearer management procedure especially based on the bearer management procedure in the 3GPP EPS, a person skilled in the art will understand that the bearer management procedure when executing the G-AMBR is also applicable in the case where the U plane traffic of the MTC device is sent in a GPRS core, an UMTS core, or any other system that use bearer management.

<Operation when the AvGrBW is Stored in the MME>

Sending bearer modification signaling to notify the AvGrBW allocation between bearers to all MTC devices in the group which are currently not scheduled to send U plane traffic is needless signaling and a waste of network resources, as mentioned earlier. Besides, in the case where an MTC device is not scheduled to send uplink U plane traffic, activating the MTC device from the idle mode and notifying the AvGrBW allocation of all bearers is a waste of power of the MTC device. In view of this, a more preferred example is provided that, whenever the AvGrBW is changed, the bandwidth of the associated bearer of the MTC device is notified to the MME, and the MME stores the bandwidth until the MTC device wishes to send U plane traffic. The P-GW notifies the bearer bandwidth of the MTC device modified in relation to the new AvGrBW through the use of a bearer modification procedure, and the MME does not notify the value to the MTC device until necessary. This bearer modification procedure is described below, according to the preferred embodiment of the present invention. The following describes the more preferable bearer management procedure in this embodiment, with reference to FIG. 2B.

Figure 2B:
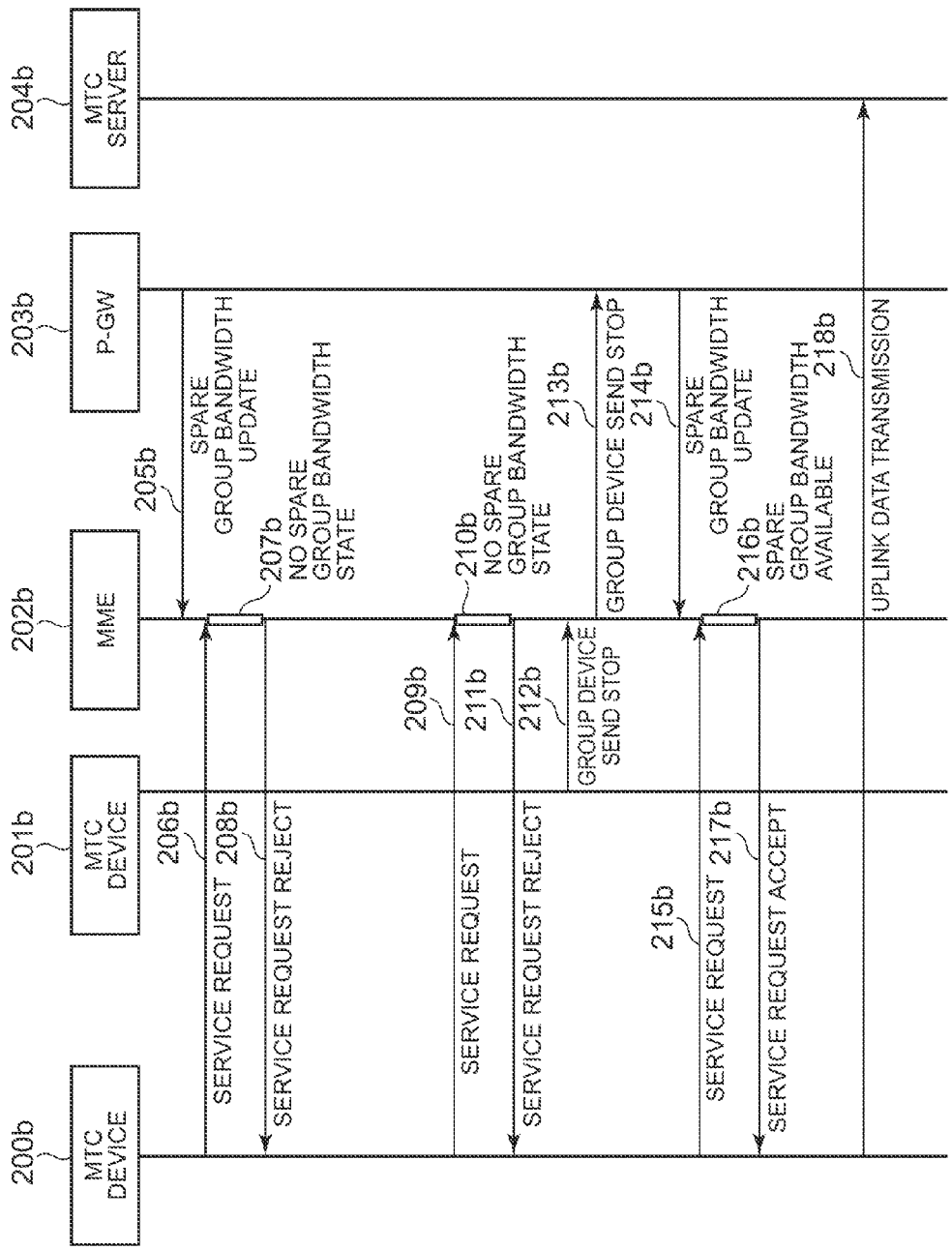
FIG. 2B is a sequence chart showing a first example of an operation in an embodiment of the present invention.

In FIG. 2B, MTC devices 200b and 201b are MTC devices which belong to an MTC device group performing group-based communication with an MTC server 204b. An MME 202b is an MME selected for the MTC devices 200b and 201b by respective eNBs. A P-GW 203b is a G-AMBR enforcement point and an AvGrBW calculation point. The MTC device 200b is in the idle mode, whereas the MTC device 201b is in the connected mode and is sending U plane traffic to the MTC server 204b.

As mentioned earlier, in some arrangement structure, the AvGrBW and the AvGrBW allocation between bearers of the MTC device 200b are notified to the MME 202b using an associated bearer modification procedure. Since the MME 202b knows that the MTC device 200b is in the idle mode, the MME 202b stores these bearer contexts in a storage unit of the MME 202b, without sending the bearer contexts to the MTC device 200b.

In such an operation scenario, the P-GW 203b sends a bearer modification message of a bearer that is an AvGrBW-related bearer and pertains to the MTC device 200b, using a signaling message 205b. The message 205b is stored in the MME 202b, without being transferred to the MTC device 200b. Suppose, after the signaling message 205b is sent, the MTC device 200b transitions from the idle mode to the connected mode, and sends a service request message 206b to the MME 202b. The MME 202b checks the AvGrBW stored for the MTC device 200b, thereby determining whether or not the AvGrBW is sufficient for the MTC device 200b. The AvGrBW of the MTC device 200b is notified to the MME 202b by bandwidth information embedded in the bearer modification message 205b. When the AvGrBW is 0 as shown by a state 207b, the MME 202b sends a service request response message 208b, thereby rejecting the service request using an appropriate clause. For example, the clause can be set to rejection due to insufficient AvGrBW.

When the AvGrBW is more than 0, the MME 202b may simply notify a bandwidth related to a default bearer or a dedicated GBR bearer in the service response procedure 208b, to cause the MTC device 200b to determine whether or not the bandwidth is sufficient for U plane traffic transmission. In this case, the MME 202b notifies the bearer-related bandwidth by a new information element in the service response NAS message 208b, without rejecting the service request by the reject clause.

In the case where the MTC device 200b reports the bit rate necessary for U plane traffic transmission by the service request 206b, the MME 202b sends the service accept message or the service reject message based on the AvGrBW and the AvGrBW allocation between bearers of the MTC device 200b. If there is a single GBR bearer that supports the requested bit rate, the GBR bearer is allowed, and its bearer identifier is notified by the service request response message 208b. When the AvGrBW is more than 0 but is insufficient to support the requested bit rate, the service reject message 208b is sent. If the bit rate requested by the MTC device 200b can be supported not by a single existing GBR bearer but by a combination of a plurality of GBR bearers, the MME 202b rejects the service request 206b, and also notifies to further notify a new bearer value, to wait for bearer information, and not to retry the service request until paging is received. The wait for the paging information can be reported by the message 208b. The MME 202b may request the P-GW 203b to establish a bearer for the MTC device 200b. To realize the new bearer, there is a need to abandon an existing GBR bearer and create a new GBR bearer. When an old GBR bearer is disabled and a GBR bearer necessary for the MTC device 200b is created, the MME 202b can send paging to the MTC device 200b. Upon receiving the paging, the MTC device 200b executes the service request to the MME 202b. In the service response, the attribute of the new GBR bearer for enabling uplink U plane traffic transmission is sent to the MTC device 200b.

In the case where the NAS message 208b is the service reject message, the MTC device 200b waits for a random time period, and then retries the service request to transition to the connected mode. The retried service request is shown by a signaling message 209b in FIG. 2B. It is assumed here that, during this time, no device in the group stops sending uplink U plane traffic and the AvGrBW state in the MME 202b is unchanged. A state 210b shows that there is no state change during the retried service request. In such a case, the MME 202b sends another service request reject message 211b to the MTC device 200b.

In this scenario, suppose the MTC device 201b stops sending U plane traffic, and as a result sends a send stop message 212b to the MME 202b. Note that the message 212b is an optional message and does not necessarily need to be sent. In the case of executing detach from the network, the MTC device 201b sends a detach NAS message 212b to the MME 202b. The detach message 212b is further sent to the P-GW 203b for detach notification. Upon receiving a detach message 213b, the P-GW 203b recalculates the AvGrBW. The new AvGrBW is notified to the MME 202b using a signaling message 214b. It is assumed here that the AvGrBW notified by the signaling message 214b is sufficient to send the uplink U plane traffic of the MTC device 200b.

Upon receiving again the message 215b to retry the service request, the MME 202b sends a service request accept message 217b to the MTC device 200b, as the spare group bandwidth is available (a state 216b). Given that the service request is accepted (the message 217b), the MTC device 200b has succeeded in sending the U plane traffic to the MTC server 204b. The U plane traffic is shown by a message 218b. The advantages of this method lie in that the bearer information does not necessarily need to be sent and that the notification is performed only in the case where the MTC device intends to send data and accordingly sends the service request. Thus, the problem of sending needless signaling and paging signaling in the core network can be solved, and the power of the MTC device can be saved. However, the method shown in FIG. 2B is disadvantageous in that the MTC device 200b having the high priority traffic to be sent still needs to wait for a certain time period to obtain the necessary bandwidth, and also needs to execute the service request signaling a plurality of times to transition to the connected mode.

In the case where the MTC device 200b transitions from a detached mode to an attached mode, the MTC device 200b receives the bearer-related information using a normal bearer creation procedure. In the attached mode, the MTC device 200b can obtain the related bearer parameter by inquiring of the MME 202b, or the MME 202b can pass the bearer information without storing it. Though the above description concerns the 3GPP structure, a person skilled in the art will be able to apply the above-mentioned method to other structures performing the same operation.

<Main Operation of the Present Invention>

The following describes an operation in the preferred embodiment of the present invention. Though the main basic principle of the present invention is as described above, an operation in an arbitrary network architecture is described below. This arbitrary network architecture is a typical architecture mainly composed of three components (e.g. an MTC device, an MTC server, and a network component for the MTC device to reach the MTC server). The network component may be composed of a router and a gateway that enable transmission of user plane traffic and control plane traffic from the MTC device. The network component may be included in an access network, a transmission network, or a typical internet. The network component can create and maintain one or more bearers for each connected MTC device. As mentioned above, in the case where the MTC device uses a bearer for U plane transmission, the bearer has a feature of a QoS support level provided to the U plane traffic. Though the main operation of the present invention is described especially based on a communication environment related to M2M communication in the embodiment of the present invention, a person skilled in the art will understand that the present invention is also applicable to general settings in which the MTC device is an arbitrary mobile device and the MTC server is an arbitrary type of server.

Signaling exchange shown in FIG. 3A is described for better understanding of the operation of the present invention. Before the detailed description of such signaling exchange, high-order operation of the present invention are described first, with reference to FIG. 3A. In FIG. 3A, an MTC device 300a communicates with an MTC device 302a through a network 301a. The network 301a is an arbitrary network entity on a path between the MTC device 300a and the MTC server 302a. In the operation according to the present invention shown in FIG. 3A, the MTC device 300a sends a requirement for sending high priority, high bandwidth, real time U plane traffic to the network 301a (representing the network entity). In the case where there is no AvGrBW, the network 301a allows the MTC device 300a only to use a minimum bandwidth bearer, even if the MTC device 300a already has a plurality of connected bearers. In the case where there is no available bandwidth for the MTC device group (e.g. AvGrBW=0), the network 301a does not desire to allow the MTC device 300a in the group to use a high QoS bearer, and only assigns the minimum bandwidth bearer to the MTC device 300a. The minimum bandwidth bearer means a bearer associated with a minimum bandwidth and low QoS. By assigning the low QoS to the minimum bandwidth bearer, when U plane traffic is sent via the bearer, the network 301a does not need to prioritize the traffic, and so the U plane traffic sent via the minimum bandwidth bearer is kept from affecting U plane traffic flows of other devices. The other devices mentioned here may not necessarily be devices in the group. Moreover, by assigning the minimum bandwidth to the minimum bandwidth bearer, the network 301a does not need to use, for the U plane traffic sent via the minimum bandwidth bearer, an important resource from another device not belonging to the group.

Having determined the minimum bandwidth bearer, the network 301a notifies a bearer identifier of the minimum bandwidth bearer to the MTC device 300a. The MTC device 300a determines that the bearer sent from the network 301a is the minimum bandwidth bearer, recognizes associated QCI based on a static configuration and, when using a bearer related to U plane traffic transmission, internally adjusts QoS parameters (i.e. bandwidth, link buffer property). Note that each QCI scalar is mapped to an arbitrary QoS parameter. In the case where the MTC device 300a does not have the QCI for the minimum bandwidth bearer or the statically stored related QoS parameter, the network 301a may explicitly provide the QCI scalar for the minimum bandwidth bearer and the QoS parameter corresponding to the QCI scalar to the MTC device 300a, in addition to the bearer ID of the minimum bandwidth bearer.

Upon receiving the notification of the minimum bandwidth bearer, the MTC device 300a correctly determines the bearer as a bearer available for sending, to the MTC server 302a, a warning message for obtaining a bandwidth that enables transfer of high priority, high bandwidth, real time U plane traffic. After determining the property of the minimum bandwidth bearer, the MTC device 300a internally adjusts the QoS parameters to use the minimum bandwidth bearer. The MTC device 300a adjusts the U plane traffic transmission rate to a minimum value relating to the QCI of the minimum bandwidth bearer, and inputs the QCI corresponding to the minimum bandwidth bearer to an internal uplink buffer. To notify the insufficient bandwidth state in the network 301a to the MTC server 302a, the MTC device 300a uses the minimum bandwidth bearer. It is important here that, even in the case where the AvGrBW is more than 0 but the U plane traffic rate needed by the MTC device 300a is more than the AvGrBW, the network 301a assigns the minimum bandwidth bearer to the MTC device 300a.

After the warning is sent to the MTC server 302a and the used bandwidth is released to generate a state in which there is a bandwidth exceeding the AvGrBW, the MTC server 302a notifies the bandwidth release state to the MTC device 300a. Having recognized the bandwidth available state, the MTC device 300a requests the network 301a to restore the QCI for the minimum bandwidth bearer and, through the use of this, sends the high priority, high bandwidth, real time U plane traffic to the MTC server 302a.

The detailed operation of the present invention are described below. The MTC device 300a sends service request signaling 303a, to notify that the MTC device 300a is scheduled to send the high priority, high bandwidth, real time traffic. A trigger indicating that the MTC device 300a is to send the high priority, high bandwidth, real time traffic may be in an arbitrary form. For example, U plane traffic bit rate, bandwidth, or some kind of identifier characterizing such a requirement may be used. The network entity 301a checks the AvGrBW for the group. In the case where the AvGrBW for the group is 0, the network entity 301a notifies to the MTC device 300a that only the minimum bandwidth bearer is available. Such information about the minimum bandwidth bearer is provided as a response message 304a. Upon receiving the response message 304a, the MTC device 300a executes an operation necessary for setting up the minimum bandwidth bearer. Note that the setup of the minimum bandwidth bearer can be executed regardless of whether or not there is explicit signaling. The response message 304a may be a service request response message (Service Accept) that includes a value indicating a time interval (backoff timer) in which only minimum data can be sent. In the case where the backoff timer is included in the received response message 304a, the MTC device 300a determines that high priority, high bandwidth traffic cannot be sent until the received timer expires. That is, the backoff timer indicates that the bearer establishment corresponding to the service request sent from the MTC device 300a is made after a predetermined time (backoff timer expiration). In this case, the entity in the network 301a notifying the backoff timer is an MME.

After recognizing the presence and configuration of the minimum bandwidth bearer, the MTC device 300a sends a warning message to the MTC server 302a as shown by a message 305a, using the minimum bandwidth bearer. In the case where the backoff timer is included in the response message 304a received form the network 301a as mentioned above, the MTC device 300a sends the warning message to the MTC server 302a as shown by the message 305a using the minimum bandwidth bearer, while the backoff timer received from the network 301a is valid. The warning message 305a is considered to be a user plane message, and specifically sent to request a certain bandwidth. The MTC server 302a communicates with the network 301a to obtain the bandwidth related to the group or to release a bandwidth for use of the MTC device 300a using some kind of method. The method used here may be that, in the case where U plane traffic sent by another MTC device to the MTC server 302a is not very important, the MTC server 302a notifies to this MTC device to stop sending the U plane traffic. Exchange of information between the MTC server 302a and the network 301s is not explicitly shown in FIG. 3A. After recognizing that the bandwidth necessary for the MTC device 300a is available, the MTC server 302a sends a clear-to-send (CTS) application layer message 306a to the MTC device 300a. Upon receiving the application layer message 306a, the MTC device 300a executes bearer modification signaling 307a to the network entity 301a. The message 307a is intended to request restoration of a higher QoS property for the minimum bandwidth bearer, as a result of which the MTC device 300a can send high priority, high bandwidth, real time U plane traffic to the MTC server 302a. Moreover, in the case where the MTC device 300a recognizes that a predetermined bearer other than the minimum bandwidth bearer assigned to the MTC device 300a is sufficient to send the U plane traffic to the MTC server 302a, the MTC device 300a may execute bearer modification for such a bearer which is not the minimum bandwidth bearer.

Before accepting the bearer modification request by the message 307a, the network entity 301a checks whether or not the current AvGrBW is sufficient. Having recognized that there is the sufficient bandwidth to satisfy the requirement embedded in the message 307a, the network entity 301a sends an acknowledgement as shown by a message 308a. In the acknowledgement message 308a, the network entity 301a assigns an identifier of the minimum bandwidth bearer, or assigns an identifier of another existing bearer that enables transmission of the high priority, high bandwidth, real time U plane traffic of the MTC device 300a. Upon receiving the message 308a, the MTC device 300a sends a U plane message in which the bearer ID is added to the message 308a, to the MTC server 302a. The U plane data message to the MTC server 302a is shown by a message 309a.

From the above description of the operation of the present invention, it is clear that, by applying the method of the present invention in the case where the AvGrBW is 0 or too low to send high priority U plane traffic from the MTC device 300a to the MTC server 302a, the necessary bandwidth can be obtained without any inefficiency associated with the conventional art. According to the method of the present invention, the minimum bandwidth bearer having reduced QoS is set up to communicate with the MTC server 302a, as a result of which the MTC server 302a can restore the AvGrBW state to a higher value by excluding another MTC device sending low priority traffic. The special property of the minimum bandwidth bearer is that, in the case where the QoS of the minimum bandwidth bearer is obtained by changing the QoS of an existing bearer, the minimum bandwidth bearer is assigned to the MTC device 300a without addition of explicit bearer modification signaling in the network for notifying the changed QoS to the MTC device 300a or the router. When sending the U plane traffic to the MTC server 302a using the minimum bandwidth bearer, the ID of the minimum bandwidth bearer is added to the message. The router on the path recognizes that the ID relates to the minimum bandwidth bearer, and performs a minimum necessary QoS procedure on the U plane traffic. Here, the ID of the minimum bandwidth bearer is unique and only relates to the minimum bandwidth bearer. Accordingly, even if the router on the path of the U plane traffic does not receive explicit bearer modification signaling from the network, upon detecting the ID of the minimum bandwidth bearer, the router recognizes the QoS procedure to be performed. In the case where an existing bearer is the minimum bandwidth bearer, an ID of the bearer is changed to the ID of the minimum bandwidth bearer. In such determination of the minimum bandwidth bearer, the ID of the minimum bandwidth bearer is mapped to specific QoS, and this mapping is stored in the router and the MTC device 300a beforehand.

<Detailed Operation of the Present Invention in the 3GPP Scenario—In the Case where the Minimum Bandwidth Bearer is a Default Bearer Having Modified QCI>

The following describes the case where a default bearer is used, with reference to the operation of executing signaling exchange shown in FIG. 3A. That is, the use of the default bearer as the minimum bandwidth bearer is described below. The detailed operation of the present invention in the case where the network between the MTC device and the MTC server is a 3GPP network segment that can have a network architecture disclosed in Non-patent Document 2 is as follows. There are two instances where the default bearer is used as the minimum bandwidth bearer. In the first instance, the MTC device only has the default bearer, and the default bearer with reduced QoS is regarded as the minimum bandwidth bearer. In the second instance, the MTC device has the default bearer and a dedicated bearer, and only the default bearer is assigned as the minimum bandwidth bearer without reducing the QoS of the default bearer. It is assumed that, when using the default bearer as the minimum bandwidth bearer in the second instance, the QoS of the default bearer is low and the QoS parameter for the default bearer does not need to be reduced. Thus, in the second instance, the QCI value does not need to be modified as in the first instance.

The detailed operation in the case where the default bearer is used as the minimum bandwidth bearer in a 3GPP configuration is described below, with reference to FIG. 3B. The instance where only the single default bearer is present for the MTC device is described first, and the instance where the dedicated bearer assigned to the MTC device is present is described next.

In FIG. 3B, MTC devices 300b and 301b normally communicate with an MTC server 304b, and the G-AMBR is imposed. The MTC devices 300b and 301b are assigned IP addresses by a network entity 303b such as a P-GW. It is assumed here that the network entity 303b is a P-GW. The MTC devices 300b and 301b are connected to an MME 302b. In such a 3GPP-oriented configuration, the MTC device 301b has a U plane communication session with the MTC server 304b, whereas the MTC device 300b has high priority, high bandwidth, real time U plane traffic to be sent to the MTC server 304b and is currently in the idle mode.

Moreover, only a default bearer is set up for the MTC device 300b, and this default bearer state is held in network entities such as the MME 302b, the P-GW 303b, and the MTC device 300b. The default bearer state indicates a bearer ID, an APN, a QCI, an IP prefix value, and the like. In the case where the MTC device 300b does not require a very high QoS procedure for the flow and is able to communicate with the MTC server 304b using only the default bearer, the scenario that the MTC device 300b has only the default bearer is highly conceivable. To send the high priority U plane traffic to the MTC server 304b, the MTC device 300b sends a service request message as shown by a message 305b. The MTC device 300b can embed a flag indicating the need to send the high priority, high bandwidth, real time U plane traffic, in the service request message 305b. The flag may be a new information element added to the service request message 305*b*. The MTC device 300*b* may also embed an explicit bit rate and bandwidth profile in the message 305*b*. Another derivative example is that the MTC device 300*b* sends the message 305*b* with the flag and the MME 302*b*, having recognized the flag, obtains the profile of the traffic relating to the MTC device 300*b* from a cache or database stored therein. In such an example, the profile of the traffic of the MTC device 300*b* is statically configured in the MME 302*b*. In the case where, after receiving the message 305*b*, the MME 302*b* recognizes that the AvGrBW is 0 as shown by a state 306*b*, the MME 302*b* sends a service request response message to the MTC device 300*b*, as shown by a message 307*b*. The response message 307*b* desirably notifies the bearer ID of the minimum bandwidth bearer to the MTC device 300*b*. As in the above-mentioned embodiment, in the case where the MTC device is in the idle mode, the MME 302*b* can retain the bearer information without sending the bearer modification message to the MTC device. In such an optimized operation, the MME 302*b* has all information about the bearer of the MTC device 300*b*, and so is capable of immediately responding with the appropriate message 307*b*. The bearer information may include the AvGrBW information. The MTC device 300*b* receives the message 307*b*, and detects the bearer ID of the minimum bandwidth bearer. The MTC device 300*b* recognizes that the bearer ID is temporarily assigned to the default bearer, and learns that the network intends to assign the minimum bandwidth bearer to the MTC device 300*b*. In another example, a new information element (e.g. cause value) can be inserted to the response message 307*b*, which the MTC device 300*b* interprets as minimum bandwidth bearer allowance. In the case where a new information element is present in the message 307*b*, the MTC device 300*b* can specify the ID of the minimum bandwidth bearer preconfigured and stored in the MTC device 300*b*. According to this preconfiguration, the MTC device 300*b* already knows the bearer ID of the minimum bandwidth bearer, and so can immediately specify the information in the response message 307*b*. Even without the preconfiguration, the MTC device 300*b* may determine, in the case where a new bearer ID is present in the response message 307*b*, the bearer ID as the bearer ID of the minimum bandwidth bearer. In the case where the backoff timer is included in the response message 307*b*, the MTC device 300*b* interprets that only the minimum bandwidth bearer is allowed while the timer is valid. When the timer expires, the MTC device 300*b* determines that a normal bearer can be created, and sends a high priority, high bandwidth service request.

When sending the U plane traffic using the minimum bandwidth bearer, the MTC device 300*b* recognizes that the minimum bandwidth bearer is assigned as mentioned above, and then internally modifies the QoS. The minimum bandwidth bearer is the default bearer, and the MTC device 300*b* associates a new QCI with the default bearer. Such internal association is shown by a procedure 308*b*. After the minimum bandwidth bearer modification and configuration are internally performed, the MTC device 300*b* associates the minimum bandwidth bearer ID with a user plane packet, and sends a U plane warning message 309*b* to the MTC server 304*b*. A person skilled in the art will understand that the default bearer ID is changed to the static minimum bandwidth bearer ID and as a result every router executes a minimum QoS procedure on the message 309*b*. The MTC device 300*b* also sends U plane traffic of extremely low bandwidth to the MTC server 304*b*, to notify its state to the MTC server 304*b*.

Upon receiving the message 309*b*, the MTC server 304*b* determines a method of obtaining the bandwidth necessary for the MTC device 300*b*. In one method, the bit rate information of the high priority U plane traffic to be sent from the MTC device 300*b* may be included in the message 309*b*. By recognizing the bit rate information, the MTC server 304*b* can easily determine the bandwidth to be released for accommodating the MTC device 300*b*. In the case where the MTC server 304*b* has a bit rate monitoring property, the MTC server 304*b* can specify all other devices in the group that need to stop sending data in order to obtain the bandwidth for the MTC device 300*b*. If the MTC server 304*b* can predict that the flow of another MTC device is not very important, the MTC server 304*b* may only need to stop the transmission of the other MTC device. In the case where the MTC server 304*b* does not have the bit rate monitoring property, the MTC server 304*b* may communicate with the P-GW 303*b* so that the P-GW 303*b* assists in specifying the MTC device to be shut down. However, since the MTC server 304*b* has the application layer and has a function of specifying an MTC device in the group not sending high priority traffic, the MTC device that can stop the transmission is specified by the MTC server 304*b* alone.

In the case where the MTC server 304*b* specifies that the U plane traffic of the MTC device 301*b* can be stopped, the MTC server 304*b* sends a send stop message to the MTC device 301*b* using a message 310*b*. To ensure the bandwidth for the MTC device 300*b* without being used by any other MTC device, the MTC server 304*b* may request the P-GW 303*b* to explicitly reserve the bandwidth necessary for the MTC device 300*b*. By this reservation, the AvGrBW for the MTC device 300*b* increases while the AvGrBW for the other device decreases. Having recognized that the sufficient bandwidth for the MTC device 300*b* is available, the MTC server 304*b* sends a CTS message to the MTC device 300*b*. The CTS message is shown by a message 311*b*. Upon receiving the message 311*b*, the MTC device 300*b* determines to execute bearer modification on the default bearer. The bearer modification is performed to restore a higher value of the QoS property of the default bearer. As a result, the MTC device 300*b* can send the high priority, high bandwidth, real time U plane traffic. The MME 302*b* receives a default bearer modification request message 312*b* and, in the case of having information that the AvGrBW is higher than the relevant bandwidth (a state 313*b*), executes a bearer modification procedure to restore the QCI for the default bearer. The ID of the default bearer (different from the ID of the minimum bandwidth bearer) is sent back to the MTC device 300*b* using a bearer modification request response message 314*b*.

Upon receiving the ID of the default bearer through the message 314*b*, the MTC device 300*b* starts sending uplink traffic 315*b* to the MTC server 304*b*. As a derivative example, the MTC device 300*b* may request a new dedicated bearer in the bearer modification request message 312*b* so as to send the high priority traffic. As another derivative example, the network may create a dedicated bearer, instead of modifying the default bearer. An ID of the newly created dedicated bearer can be notified using the message 314*b*.

The second instance where the existing default bearer is simply notified to the MTC device 300*b* as the minimum bandwidth bearer by the response message 307*b* is described next. When the existing default bearer is reported as the minimum bandwidth bearer, the MTC device 300*b* may associate a plurality of bearers with this. In the second instance, the response message 307*b* simply carries the ID of the default bearer. Upon receiving the ID of the existing default bearer by the message 307*b*, the MTC device 300*b* determines that only the default bearer is usable for sending the warning message 309*b* to the MTC server 304*b* and the default bearer without modification is the minimum bandwidth bearer. Having recognized the response message 307b, the MTC device 300b also determines that the warning message 309b needs to be sent using the minimum bandwidth. In this example, the QoS of the default bearer is very low, so that further internal modification of the QoS by the MTC device 300b is unnecessary. Accordingly, the step 308b need not be executed. In the second instance, too, in the case where the backoff timer is included in the response message 307b, the MTC device 300b may determine that the default bearer is the minimum bandwidth bearer while the timer is valid. The MTC device 300b also determines that the warning message 309b needs to be sent on the default bearer while the backoff timer is valid.

In the example where the default bearer is simply used as the minimum bandwidth bearer and the plurality of bearers are associated with the MTC device 300b, the MTC device 300b can request to modify the default bearer so as to have higher QoS than the QoS of the default bearer, or request to modify the existing dedicated bearer. The MTC device 300b may simply request a new dedicated bearer, instead of the message 312b. The MME 302b determines a method for processing the request 312b. There are a plurality of methods by which the MME 302b can process the request 312b. Any of these methods can be used without affecting the primary points of the present invention.

<Another Operation of the Present Invention—Explicit Creation of Minimum Bandwidth Bearer>

There is also a structure in which it is desirable to explicitly create the minimum bandwidth bearer in the case where there is no AvGrBW. This example is described below. In the case where the modification of the QoS property of the default bearer to a very low QoS value is forbidden, it is appropriate to create a dedicated bearer of minimum bandwidth and improve the QoS property of the minimum bandwidth dedicated bearer, as shown in FIG. 3C. Thus, there is an instance where it is useful to create the minimum bandwidth dedicated bearer. There is also an instance where the minimum bandwidth dedicated bearer is used together with the default bearer. Here, the minimum bandwidth dedicated bearer may be used for traffic that requires minimum QoS.

The following describes main steps of this other example of the present invention, with reference to FIG. 3C. In the main operation environment of the present invention, the MME can maintain the bearer context relating to the AvGrBW of one or more bearers of the MTC device, without providing the bearer context to the MTC device until the MTC device executes the service request procedure. The bearer context is provided from the P-GW using a P-GW initiated bearer modification procedure. This operation is described in detail below.

MTC devices 300c and 301c normally communicate with an MTC server in a group-based communication scenario. The G-AMBR is imposed on each MTC device communicating with an MTC server 304c. The MTC device 301c is currently sending uplink traffic to the MTC server 304c, whereas the MTC device 300c is in the idle mode. The MTC device 300c may have a plurality of associated bearers. After a predetermined time, the MTC device 300c has U plane traffic to be sent to the MTC server 304c. The U plane traffic to be sent from the MTC device 300c is high priority, high bandwidth, real time traffic. Here, the MTC device 300c has appropriate application layer intelligence capable of classifying high priority, high bandwidth U plane traffic. The application layer of the MTC device 300c reports such traffic classification (i.e. high priority and high bandwidth) to a NAS layer, as a result of which high priority traffic notification is embedded in a service request message of a service request initiated by the NAS layer. When the NAS layer of the MTC device 300c receives such a high priority trigger, the MTC device 300c sends a service request message 305c to a MME 302c. An information element indicating that the MTC device 300c executes the service request for high priority, high bandwidth traffic transmission is present in the service request message 305c.

Upon receiving the service request signaling message 305c, the MME 302c first checks whether or not the AvGrBW is sufficient to send the profile of the traffic of the MTC device 300c. The traffic profile or the traffic property may be embedded in the service request message 305c, and the parameter of the traffic profile may be a bit rate. In the case where the AvGrBW is insufficient and cannot support the request of the signaling message 305c as shown by a state 306c, the MME 302c initiates a minimum bandwidth dedicated bearer creation procedure. The minimum bandwidth bearer creation signaling procedure is shown by a message 307c. The minimum bandwidth dedicated bearer has a QCI (QoS) lower than that normally associated with the default bearer. Typically, the default bearer is used for U plane traffic and has relatively high QoS. On the other hand, the minimum bandwidth dedicated bearer is mainly used to send a warning or a help trigger to the MTC server 304c, and accordingly high QoS is not needed for the minimum bandwidth dedicated bearer. The minimum bandwidth dedicated bearer is associated with an extremely low bandwidth.

In the case where the AvGrBW is sufficient and the bandwidth necessary for sending the traffic of the MTC device is lower than the AvGrBW, the MME 302c checks which bearer (i.e. bearer identifier) is to be assigned to the traffic of the MTC device 300c. When the service request 305c requests a GBR bearer and the GBR bearer-related bandwidth of the MTC device 300c is sufficient to send the traffic, a GBR bearer is provided. When the GBR bearer request is not made in the message 305c and the available bandwidth for the non-GBR bearer pool is sufficient to send the traffic, a non-GBR bearer is provided. When the requested bearer is a GBR bearer having an arbitrary bandwidth but the GBR bearer having the required bandwidth is not present for the MTC device 300c, the MME 302c disables an existing GBR bearer, and creates one high bandwidth GBR bearer for the MTC device 300c. When the requested bearer is any type of bearer and the bandwidth for the non-GBR pool is insufficient, a GBR bearer may be disabled to provide a non-GBR bearer. It is clear from the above description that the minimum bandwidth dedicated bearer is created in the case where the AvGrBW is insufficient to send the traffic of the MTC device 300c. In other cases, an appropriate bearer is specified and provided by a service request response message 308c.

It is important that the sum total of the bandwidth available to all non-GBR bearers and the bandwidth related to all single GBR bearers of the predetermined MTC device is equal to the AvGrBW. For example, suppose there are four non-GBR bearers and two GBR bearers, the bandwidth related to each GBR bearer is 10 units, and the AvGrBW is 60 units. In this case, the bandwidth available to all non-GBR bearers is (60−(10+10))=40 units. Meanwhile, the bandwidth of the non-GBR bearer pool is AvGrBW−(bandwidth related to all GBR bearers).

The minimum bandwidth dedicated bearer can be created in various methods. Though the existing new bearer creation procedure described in Non-patent Document 2 does not involve an MME-initiated bearer creation procedure, in the minimum bandwidth dedicated bearer creation according to the present invention, the MME 302c may trigger a bearer creation request to a P-GW 303c using a new signaling procedure. The MME 302c can send some kind of special trigger to the P-GW 303c, and the P-GW 303c can start a P-GW-initiated dedicated bearer creation procedure. The minimum bandwidth dedicated bearer is a dedicated non-GBR bearer with minimum QoS parameter. If there is no AvGrBW (i.e. AvGrBW=0) and the minimum bandwidth dedicated bearer is created, the P-GW 303c needs to notify G-AMBR violation to a PCRF without shaping the traffic for the minimum bandwidth dedicated bearer.

Once the minimum bandwidth dedicated bearer has been created, it is desirable to send the service request success NAS message 308c to the MTC device 303c. Having recognized the service response message 308c indicating the establishment of the minimum bandwidth dedicated bearer, the MTC device 300c sends application traffic that is substantially the same as control traffic, using the minimum bandwidth dedicated bearer. In the case where the backoff timer is included in the response message 308c, the MTC device 300c interprets that only the minimum bandwidth dedicated bearer for sending a warning message is allowed while the timer is valid. When the timer expires, the MTC device 300c determines that a normal bearer can be created, and sends a service request for high priority, high bandwidth transmission. Furthermore, an EPS bearer identifier of the minimum bandwidth dedicated bearer is sent via the message 308c. A U plane warning message sent to the MTC server 304c is shown by a message 309c. Upon receiving the U plane warning message 309c, the MTC server 304c starts a procedure of specifying traffic of any other MTC device in the group not engaged in high priority or important traffic transmission. Suppose the MTC server 304c specifies the MTC device 301c as a device sending unimportant traffic. The MTC server 304c has sufficient intelligence for identifying unimportant traffic, and thereby sends an application layer message to the MTC device 301c to stop transmission. Such a send-stop message is shown by a message 310c. Having specified that the MTC device 301c stops transmission, the MTC server 304c further sends a clear-to-send (CTS) application message to the MTC device 300c using the minimum bandwidth dedicated bearer. By excluding one MTC device 301c so as not to share the group bandwidth, the sufficient bandwidth for the other MTC device 300c can be secured. In the case where there is no other MTC device that can be requested to stop transmission (i.e. each other MTC device in the group is sending high priority traffic) or the necessary bandwidth cannot be obtained even when any other MTC device in the group is excluded from the group, the MTC device 300c needs to wait for bandwidth release. In general, however, a situation where each other device in the group is sending high priority traffic when the MTC device 300c is to send high priority traffic is very rare, and so the above-mentioned wait time is expected to be within a permissible range. There are also various examples of the method for determining whether or not the bandwidth is sufficient after the exclusion of the MTC device 301c and the method for determining to send the CTS message 311c. In one example, the MTC server 304c has a bit rate monitoring function, and determines to send the CTS to the MTC device 300c using this function.

Upon receiving the CTS message 311c, the MTC device 300c triggers an additional determination procedure for requesting bearer modification of the minimum bandwidth dedicated bearer, instead of creating a completely new request for a new GBR bearer. Such a bearer modification procedure is executed to obtain a bandwidth necessary for a GBR bearer. According to the standard procedure for bearer creation and modification described in Non-patent Document 2, the dedicated bearer creation is executable only by the P-GW 303c. Therefore, it is most appropriate for the MTC device 300c to initiate a bearer modification procedure for the minimum bandwidth dedicated bearer. The bearer modification request for the minimum bandwidth dedicated bearer is shown by a signaling message 312c sent to the MME 302c. The bearer modification request is typically a NAS message. Upon receiving the bearer modification request from the MTC device 300c, the MME 302c appropriately responds to the bearer modification request based on a currently available group bandwidth state 313c.

As a result of stopping transmission by the MTC device 301c, the state 313c represents an appropriate AvGrBW for enabling the MTC device 300c to send high priority traffic. When the MTC device 301c stops transmission, the P-GW 303c notifies the AvGrBW information to the MME 302c. The MME 302c accordingly sends a positive acknowledgement message in response to the bearer modification request 312c. The acknowledgement message is shown by a signaling message 314c. The bearer modification of the minimum bandwidth dedicated bearer may be executed by the P-GW 303c and notified to the MME 302c, or executed by the MME 302c and notified to the P-GW 303c. Upon receiving the appropriate bearer modification of the minimum bandwidth dedicated bearer from the MME 302c, the MTC device 300c starts sending U plane traffic to the MTC server 304c. The traffic to the MTC server 304c is shown by a message 315c.

According to the solution method described above, the MTC device 300c obtains the necessary bandwidth to send the high priority, high bandwidth traffic to the MTC server 304c without additional retry signaling, so that the objects of the present invention can be achieved. The necessary bandwidth is obtained by setting up the minimum bandwidth dedicated bearer. Though the above describes the derivative examples of the solution method based on the 3GPP-specific scenario, these derivative examples are also applicable to any system operating in the same way, without departing from the scope of the present invention.

<Another Operation of the Present Invention—the MTC Server Delegates Management to the Network Entity>

In another example of the present invention, there is no need to send the CTS message from the MTC server to the MTC device. The P-GW can, upon detecting the AvGrBW state change, send the bearer modification request to the MME which accordingly determines whether or not the bandwidth necessary for the MTC device is released by the MTC server. Having determined that the bandwidth is released, the MME passes the bearer modification message received from the P-GW, to the MTC device. This derivative example of the preferred embodiment of the present invention is described below. Though the following describes the operation of the derivative example of the present invention using a 3GPP-specific structure, a person skilled in the art will understand that the same operation is applicable in the case where the path between the MTC device and the MTC server is any typical network segment.

In FIG. 4, an MTC device 400 normally sends U plane traffic to an MTC server 404 via a P-GW 403. An MTC device 401 is sending U plane traffic to the MTC server 404, whereas the MTC device 400 is in the idle mode. The MTC devices 400 and 401 perform group-based communication with the MTC server 404, and the group bandwidth upper limit is imposed. Since all assumptions of the operation in the description of the present invention apply here and the details and assumptions of the operation are as described above, their description is omitted.

As in the above-mentioned operation of the present invention, the MTC device 400 can send a service request message to which a high priority traffic transmission trigger is added, as shown by a message 406. An MME 402 uses a state 407, and determines that a group bandwidth satisfying the traffic requirement of the MTC device 400 is not available. The MME 402 determines a minimum bandwidth bearer, and desirably notifies a bearer identifier of the minimum bandwidth bearer using a service request response message 408. The MTC device 400 then sends an emergency traffic warning to the MTC server 404. This message (PAM: Priority Alarm Message) is shown by a message 409. The MTC server 404 checks whether or not an MTC device can be excluded from the group bandwidth sharing. The MTC server 404 communicates with the P-GW 403 to obtain the bit rate related to the MTC device 400, and checks which device needs to be excluded from the group bandwidth sharing. Exchange of information between the MTC server 404 and the P-GW 403 may be performed using an interface 412. An API (Application Protocol Interface) is necessary between the P-GW 403 and the MTC server 404 so that the MTC server 404 communicates with the P-GW 403. A check procedure when the MTC server 404 determines to specify the MTC device that needs to stop communication is shown by a state 410. Having specified the MTC device 401, the MTC server 404 sends a send stop message 411 to the MTC device 401.

Here, the MTC server 404 does not send the CTS message to the MTC device 400, unlike in FIG. 3A. The MME 402 assists in notifying to the MTC device 400 for starting high priority and high bandwidth traffic transmission. When the MTC device 401 stops transmission, the AvGrBW state in the P-GW 403 changes, that is, the AvGrBW is increased in the P-GW 403. The P-GW 403 accordingly sends bearer modification signaling 413 to the MTC device 400 using a bearer modification procedure as mentioned above. The MME 402 checks the bearer modification signaling 413, and determines whether or not the AvGrBW is sufficient for the MTC device 400 to transfer the high priority and high bandwidth traffic. Such a determination procedure is the same as the one described above, and so its description is omitted.

Having determined that the MTC device 400 can start the service, the MME 402 passes an associated bearer modification message to a bearer that is expected to be used by the MTC device 400, to the MTC device 400. Alternatively, if only the minimum bandwidth dedicated bearer is present, the MME 402 passes a bearer modification message for the minimum bandwidth dedicated bearer, to the MTC device 400. The bearer modification signaling message send from the MME 402 to the MTC device 400 is shown by signaling 414. Upon receiving the bearer modification message 414, the MTC device 400 can use the notified dedicated bearer for its uplink high priority traffic transmission. In the case where the dedicated bearer is not present, the MME 402 notifies only the default bearer to the MTC device 400. The U plane traffic transmission is shown by a message 415.

A main advantage of this method is that the MTC device 400 does not need to initiate the bearer modification procedure as shown in FIG. 4, so that the MTC device which is limited in power can save battery power. Another advantage is that the MTC device 400 does not need to wait for the CTS message, which contributes to a shorter wait time for obtaining the necessary bearer. As another operation of the present invention for creating an explicit minimum bandwidth bearer, the minimum bandwidth dedicated bearer may be created during an initial attach procedure and maintained by the network. Since the minimum bandwidth dedicated bearer uses only very few network resources, the bearer can be created beforehand and maintained by the network, without causing a load on the network. Creating the minimum bandwidth dedicated bearer beforehand also has an advantage that it is possible to send the service request response message such as the message 408 without waiting for minimum bandwidth bearer creation.

<Functional Diagram of the MTC Device>

Figure 5:
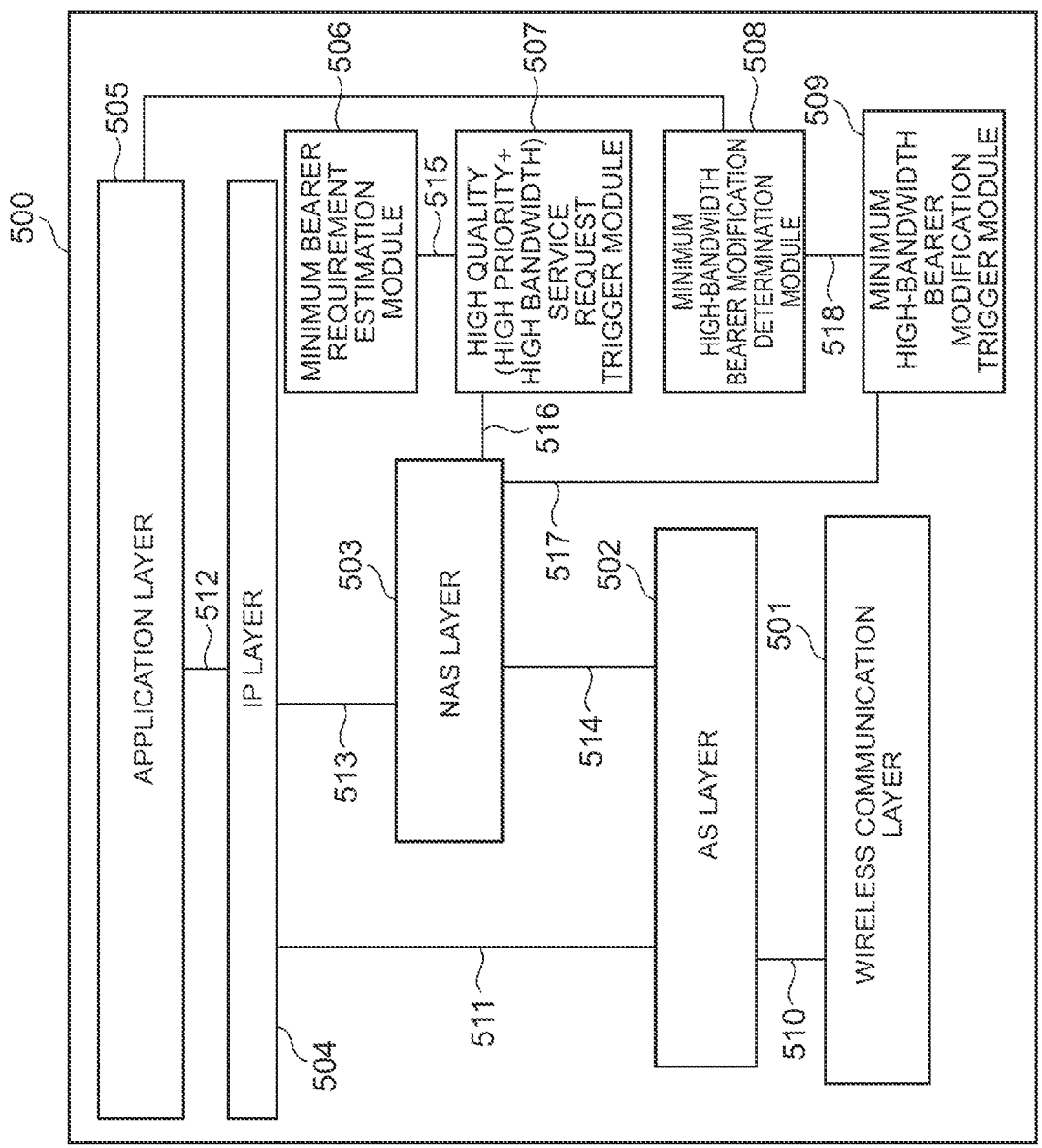
FIG. 5 is a diagram showing an example of a structure of an MTC device in an embodiment of the present invention.

The following describes a functional architecture of a mobile device (e.g. MTC device) in the preferred embodiment of the present invention. Each functional component is described below, with reference to FIG. 5. The functional components shown in FIG. 5 are preferable units to realize the mobile device according to the present invention. However, a person skilled in the art will understand that the main functional components shown in FIG. 5 can be realized by any other method without departing from the scope of the present invention.

The functional architecture shown in FIG. 5 includes all hardware, software, and firmware necessary for the MTC device to implement the present invention described above. For example, a functional architecture 500 of the MTC device has functional blocks such as an application layer 505, an IP layer (IP routing layer) 504, a NAS layer 503, an AS layer 502, and a wireless communication layer 501. In addition to these standard layers or functional blocks, the functional architecture 500 also includes modules for realizing the operation according to the present invention (a minimum bearer requirement estimation module 506, a high quality (high priority+high bandwidth) service request trigger module 507, a minimum high-bandwidth bearer modification determination module 508, and a minimum high-bandwidth bearer modification trigger module 509). Furthermore, appropriate signaling interfaces for information transfer between modules are provided between these functional entities.

The NAS layer 503 is mainly used for exchange of NAS signaling between the MTC device and its MME. Such NAS signaling is usable in tracking area update, a service request upon idle to active state transition, PDN connection establishment, PDN disconnection, a bearer modification procedure, an attach procedure, and a detach procedure. The AS layer 502 is used for all signaling between the MTC device and its eNB. The signaling of the AS layer 502 is used to establish a wireless bearer between the MTC device and the eNB. The AS layer 502 is also used for cell selection and cell monitoring. User plane traffic from the application layer 505 reaches the AS layer 502 through the IP layer 504, and eventually sent via the wireless communication layer 501. Interfaces 512, 511, and 510 are used to achieve data unit transmission of user plane packets. Likewise, appropriate interfaces are used in the NAS layer 503 to send NAS messages. These interfaces are interfaces 514 and 510 shown in FIG. 5. The wireless communication layer 501 has a physical layer protocol of the MTC device.

When determining that there is high priority and high bandwidth traffic to be sent, the MTC device triggers a service request in which a high priority and high bandwidth trigger is embedded. The determination to trigger the service request for high priority traffic is executed by the module 506. The determination to trigger the service request for high priority traffic can be made based on a trigger from the NAS layer 503 or through the use of a direct interface to the application layer 505. For example, when the application layer 505 notifies to the module 506 that the MTC device has high priority traffic, the module 506 can determine that a high bandwidth bearer is required and the high priority trigger needs to be included in the service request. After such determination is made by the module 506, control is transferred to the module 507 via an interface 515.

The module 507 forms or collects relevant data to be passed to the NAS layer 503. The relevant data may be any data indicating a bit rate, high priority, high bandwidth traffic, and the like. The module 507 passes the control data to the NAS layer 503 using an interface 516. The module 507 also has a function of processing response information from the network relating to the minimum bandwidth bearer. In the case where the minimum bandwidth bearer is a default bearer and the ID of the minimum bandwidth bearer is unique, the MTC device processes the information and internally modifies QoS. Such a function is also associated with the module 507.

The NAS layer 503 creates a service request message in which a new information element indicating high priority traffic is embedded, and sends the service request for high priority traffic through the AS layer 502 and the wireless communication layer 501. After sending the service request, the MTC device receives a CTS message from the MTC server. The application layer 505 accordingly sends a trigger to the module 508, to notify that a bearer modification procedure for the minimum bandwidth bearer can be triggered. The CTS reception trigger from the application layer is processed by the module 508. When the module 508 determines to trigger bearer modification for the minimum bandwidth bearer, control is transferred to the module 509 via a signaling interface 518. The trigger is determined by the module 509, and the NAS layer 503 is requested to send the bearer modification for the minimum bandwidth dedicated layer. The trigger from the module 509 to the NAS layer 503 is executed via a signaling interface 517.

<Device Operation Flowchart>

Figure 6:
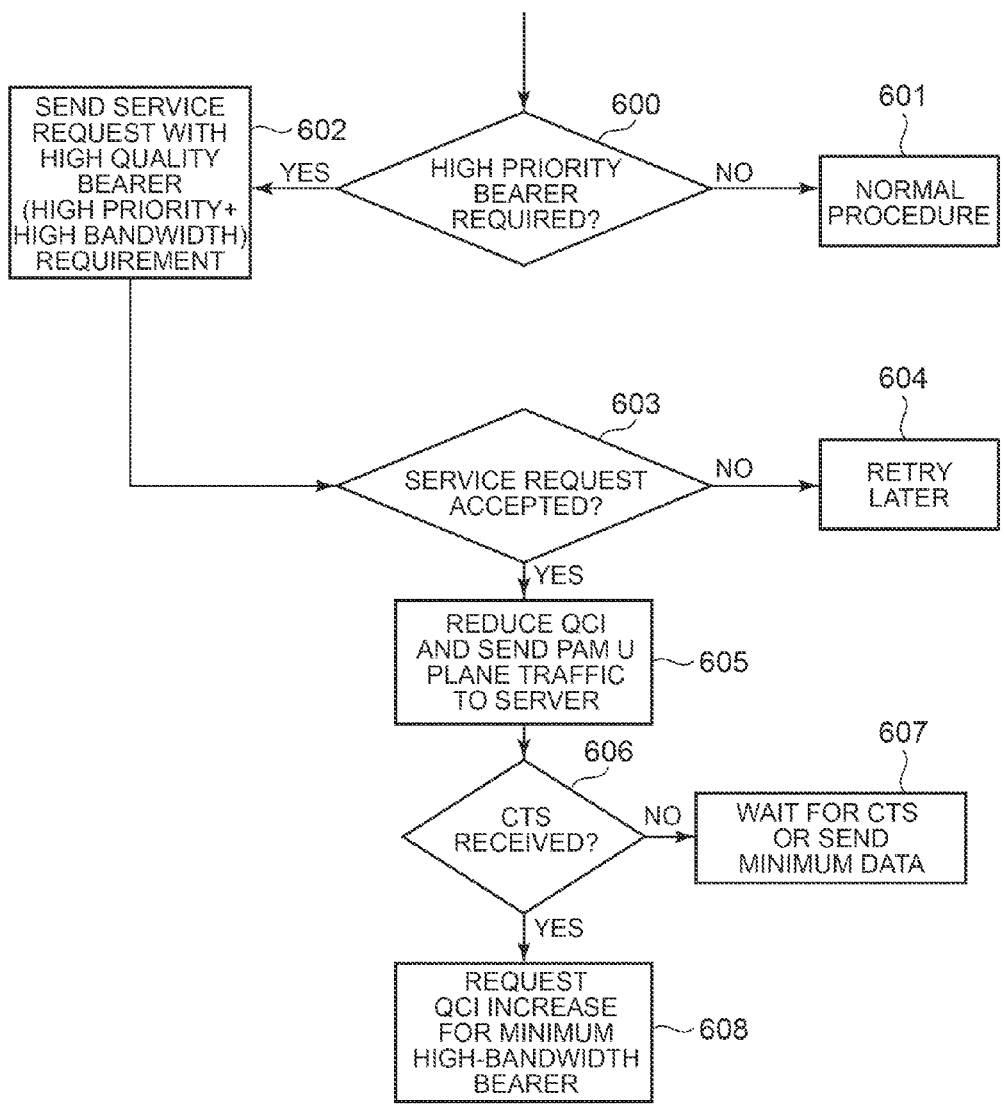
FIG. 6 is a flowchart showing an example of processes of an MTC device in an embodiment of the present invention.

The following describes the operation of the mobile device in the preferred embodiment of the present invention, with reference to FIG. 6. In the first step, check process 600 is triggered, and the mobile device (which may be the MTC device) checks whether or not a high bandwidth bearer for transferring high priority and high bandwidth traffic is required. Such check is executed in step 600. In step 600, whether or not high priority and high bandwidth traffic needs to be sent is specified. In the case where step 600 results in "NO", step 601 is executed. Step 601 has a normal process of triggering a normal service request without adding a new information element for notifying high priority and high bandwidth traffic. In the case where step 600 results in "YES", step 602 is executed. In step 602, a service request to which new information about high priority traffic is added is created and sent. After step 602, a determination procedure is triggered. The determination procedure is shown by step 603. In step 603, whether or not the service request to which the high priority trigger is added is accepted is checked. Though extremely rare, if the service request for the minimum bandwidth bearer for obtaining the bandwidth of the high priority traffic is not accepted, control is transferred to step 604, and the MTC device determines to retry the service request later.

In the case where step 603 results in "YES" and the MME provides the minimum bandwidth bearer by the service request response, control is transferred to step 605. In step 605, the MTC device reduces the QCI of the bearer in the case where the default bearer is provided, and sends a warning message to the MTC server using the minimum bandwidth bearer. After sending the warning message to the MTC server, the MTC device waits for a CTS message from the MTC server, and executes a CTS reception state check process as shown by step 606. Upon receiving the CTS, step 608 is executed, and the MTC device requests to increase the QCI of the minimum bandwidth using a device-initiated bearer modification procedure. In the case where step 606 results in "NO", step 607 is executed, and the MTC device either simply waits for the CTS, or sends emergency traffic-related information to the MTC server using the available bandwidth.

<Derivative Example to which the Present Invention is Applied>

The following describes a derivative application example according to the preferred embodiment of the present invention. This derivative example of the present invention is used to extend performance in a structure in which the core network has a time controlled function and the MTC device has a time tolerant application. The time controlled function indicates network control relating to access time of the MTC device using the network for traffic transmission. In the case where the time controlled function is present in the network, if the MTC device has the time tolerant application, it is hardly affected by the time controlled function. The time tolerate and time controlled features are described in detail in Non-patent Document 1. When the network is operating a time controlled mechanism, the network notifies this state to the MTC device, so that the MTC device does not send traffic through the network during a time controlled period. In most cases, not the MTC server but only the MTC device knows the time controlled period. In the case where the network determines to impose time control on the MTC device at the time when the time controlled period is sent, the MTC device has no bandwidth, and does not even perform access to the MTC server to notify the time controlled state. The following describes the case where the present invention is applied to such a time controlled traffic transmission environment, with reference to FIG. 7A.

In the derivative application example of the present invention, creating the minimum bandwidth bearer enables the MTC device to notify a congested state or a time controlled state in the core network to the MTC server. By notifying the congested state or the time controlled state to the MTC server, the MTC server can be kept from sending U plane traffic to the MTC device which is time controlled by the network. If the MTC server continues to send traffic to the MTC device in such a time controlled state, a plurality of problems arise in the network. The first problem relates to stored resources necessary for downlink traffic until the time controlled state is cleared. The second problem is that data may be lost due to buffer overflow.

Figure 7A:
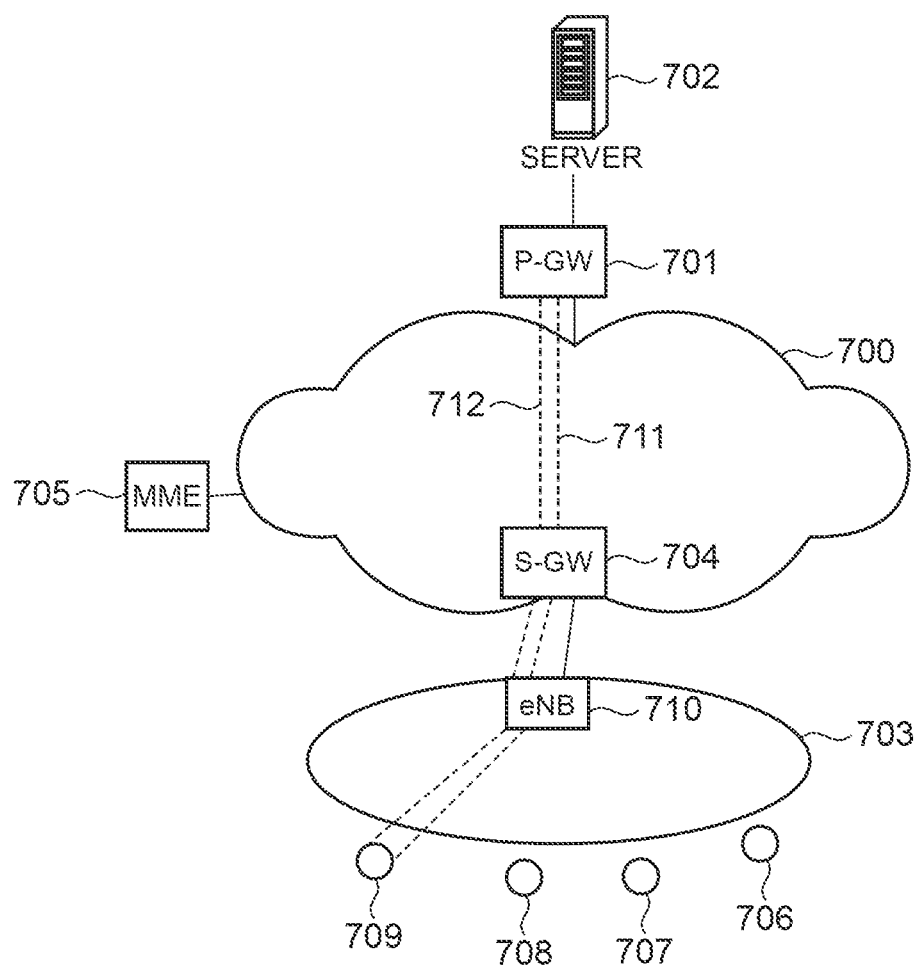
FIG. 7A is a diagram showing another example of a structure of a group-based communication model in an embodiment of the present invention.

The application example is described below, with reference to FIG. 7A. In FIG. 7A, MTC devices 709, 708, 707, and 706 communicate with an MTC server 702 via a P-GW 701. These MTC devices are connected to an eNB 710, an S-GW 704, and an MME 705, and perform group communication with the MTC server 702. In the case where a core network 700 and/or an access network 703 is in the congested state as mentioned above, the network notifies to the MTC devices that the MTC devices are forbidden to access the 3GPP network to send U plane traffic. Here, the MTC devices have time tolerant traffic.

In such a case, there is a possibility that the MTC server 702 does not know the time controlled condition and sends some kind of control or polling message to these MTC devices, thereby wasting network resources. To solve this problem, for example when the MTC device 709 receives the notification of the time controlled state of the network, the MTC device 709 can request the network to create a minimum bandwidth bearer 711, in addition to a default bearer 712. The minimum bandwidth bearer 711 is used only to notify the time controlled or congested state to the MTC server. Through the use of the minimum bandwidth bearer 711, the MTC device 709 sends the message to the MTC server 702 to notify the time controlled state. The MTC server 702 processes this information, and stops message transmission to the MTC device 709 until the time controlled period ends. If a time controlled window is static, a window period may be notified to the MTC server 702. In the case of a dynamic time controlled window period, on the other hand, the network randomly notifies the end of the time controlled period, and the MTC device 709 notifies the time control end to the MTC server 702 using the minimum bandwidth bearer.

Having resumed traffic transmission to the MTC server 702, the MTC device 709 executes a mobile device-initiated bearer modification procedure for the minimum bandwidth bearer or requests a new dedicated bearer, and holds the minimum bandwidth bearer in a dormant mode for subsequent use.

<Detailed Description of the Derivative Application Example of the Present Invention>

The following describes another derivative application example of the present invention, with reference to FIG. 7B. An MTC device 700a communicates with an MTC server 702a using an arbitrary network segment 701a. The arbitrary network segment 701a may be a 3GPP network segment. The network 701a imposes some kind of time control on the subscribed MTC device. The time control here means that the MTC device is forbidden to use the network 701a during an explicit time period. The network may impose the time control in the case where congestion occurs in the network. Time controlled information sent from the network 701a to the MTC device 700a is shown by a message 703a. The message 703a may be sent using an arbitrary type of message. In the 3GPP structure, the time controlled message 703a may be sent by a paging trigger, a service request accept, or an arbitrary NAS message, and is not limited to any specific message.

Having recognized the message 703a, the MTC device 700a sends a service request message 704a to the network 701a, to obtain the minimum bandwidth bearer for communicating with its server (the MTC server 702a). The minimum bandwidth bearer request 704a is mainly executed to notify the time controlled state of the MTC device 700a to the MTC server 702a. The network 701a creates the minimum bandwidth bearer as mentioned above, and sends a response message 705a having the ID of the minimum bandwidth bearer to the MTC device 700a. The response message to the MTC device 700a and the minimum bandwidth bearer establishment are respectively shown by messages 705a and 706a.

Suppose the time controlled period is not informed to the MTC server 702a. To prevent the MTC server 702a from sending needless traffic to the MTC device 700a, the MTC device 700a sends a U plane warning message to the MTC server 702a using the minimum bandwidth bearer. The warning message is shown by a message 707a. Having recognized the warning message, the MTC server 702a performs appropriate setting to prevent or suspend U plane traffic to the MTC device 700a. This is shown by a state 708a. After a predetermined time, the network 701a determines to relax the time control on the MTC device 700a. The time control relaxation can be reported by an explicit message 709a. In the case where the network 701a knows the time controlled period beforehand, the network 701a sends the period information by the message 703a. In most cases, however, the network 701a does not know the accurate time controlled period, and so tries to notify to the MTC device 700a by the explicit trigger 709a. Upon receiving the message 709a, the MTC device 700a requests the network 701a to extend the minimum bandwidth bearer for sending U plane traffic to the MTC server 702a. Bearer modification signaling is shown by messages 710a and 711a. Uplink data transmission is shown by a message 712a, and downlink data transmission is shown by a message 714a.

<Derivative Example of the Present Invention for Notifying the Insufficient Bandwidth State to the MTC Server Using Control Plane Signaling>

The above describes the operation of the present invention in which, when the minimum bandwidth bearer is provided, the MTC device sends the U plane warning message to the MTC server using the minimum bandwidth bearer. The U plane warning message is usable to notify that the AvGrBW is 0, or notify that the MTC device is in the time controlled state. Such a structure in which the minimum bandwidth bearer is assigned in the time controlled state or the insufficient AvGrBW state and the U plane warning message is sent to the MTC server using the bearer has several advantages. The first advantage is that the MTC device is transitioned to the connected mode by the assignment of the minimum bandwidth bearer, as a result of which the MTC server can more easily communicate with the MTC device when sending CTS information. When the MTC device is in the connected mode, there is no delay when receiving paging in the connected mode, so that delay associated with transition to the connected mode does not occur. Hence, the message reception from the MTC server requires little time. The second advantage is that, since the MTC device is reachable from the MTC server in the connected mode, paging signaling from the network and service request signaling from the MTC device can be avoided. The third advantage is that, since the MTC device uses the U plane warning message to notify to the MTC server, the message can be sent to the MTC server in a shorter time than when other means (other than a band message) or hop-by-hop transfer to the MTC server is used.

However, in the case where the MTC device can communicate with the MTC server and there is no bandwidth for notifying the AvGrBW=0 state of the MTC device, it may be effective that the MTC device notifies the current emergency state to the MTC server using control plane signaling and remains in the idle state. Typically, the power consumption is low when the MTC device is in the idle mode, because the location update frequency is low and the MTC device does not need to execute self-monitoring for handoff management. According to the preferred embodiment of the present invention, the warning message about the insufficient bandwidth state or the time controlled state is notified to the MTC server by a control plane message.

In another example of the present invention, the MTC device sends the control plane message to the network, and the insufficient bandwidth state or the time controlled state is notified from the network to the MTC server. The use of the C plane message for notifying to the MTC server has not only an advantage that the MTC device does not need to transition to the connected mode, but also an advantage that the network can communicate with the MTC server by some kind of other means without involving the core network. This is particularly effective when the network is congested or there is no bandwidth to be assigned. Another advantage of using the control plane to notify the insufficient bandwidth state (i.e. AvGrBW=0) or the time controlled state due to congestion is that the control plane message has a smaller packet size than the U plane message in the interface between the MTC device and the network. The size of the U plane message is typically larger according to a layered protocol architecture. Therefore, the use of control plane signaling to notify the warning state of the MTC device to the network is useful in a bandwidth constraint environment. Signaling exchange according to the present invention is further described below, with reference to FIG. 8.

In FIG. 8, an MTC device 800 communicates with an MTC server 802 via a network segment 801. The network segment 801 may be a 3GPP network, but is not limited to such. In this structure, the MTC device 800 may try to send high priority, high bandwidth, real time U plane traffic to the MTC server 802. The MTC device 800 is currently in the idle mode, and sends a service request message 803 to the network 801 in order to send the high priority traffic. When the message 803 is received by the network 801, the AvGrBW is 0. Here, the network 801 may determine to impose time control on the MTC device 800, when receiving the message 803. In the above-mentioned network state, the network 801 can send a service request reject message 804 having an appropriate clause. For example, the reject clause is used by the network to notify that the reason for rejection is either that the AvGrBW is insufficient or that the time control is active in the network 801.

Upon receiving the message 804, the MTC device 800 recognizes that there is no bearer to reach the MTC server 802 using a U plane message, and remains in the idle mode. After receiving the reject clause of the message 804, the MTC device 800 performs a determination procedure to determine to send a C plane message to the network 801. The C plane message is intended to request to notify the state of the MTC device 800 to the MTC server 802. In the case where the network 801 is a 3GPP network, the C plane message may be a TAU, or may be an arbitrary NAS message. Information about the AvGrBW=0 state or information about the time controlled state is embedded in a C plane message 805. The message 805 also includes information about the need to pass such state information to the MTC server 802. The network entity 801 receives the control message 805, and sends another new control message 806 to the MTC server 802. The control message 806 includes the state information of the MTC device 800. The message 806 does not need to be sent via the core network connecting the network 801 and the MTC server 802, and can be sent via another network.

In the case where the message 806 for notifying AvGrBW=0 is sent to the MTC server 802, the MTC server 802 attempts to obtain an available bandwidth for the MTC device 800 as mentioned above. After obtaining the bandwidth for the MTC device 800, the MTC server 802 can send a CTS message 807 to the MTC device 800. Since the MTC device 800 is not assigned any wireless bearer by the network 801 at the time of the last service request and remains in the idle mode, the network 801 sends a paging message 808 to the MTC device 800. Upon receiving the paging message 808, the MTC device 800 sends a service request message 809, and transitions to the connected mode. After the service request 809 is accepted, the MTC device 800 transitions to the connected mode, and all wireless bearers are set up. The MTC device 800 can thus receive the CTS message 807 buffered in the network 801.

Since the MTC server 802 obtains the bandwidth added to the AvGrBW, the AvGrBW is more than 0. Accordingly, the network 801 sends a service request accept message 810 to the MTC device 800. The service request accept message 810 may include the notification that the appropriate bandwidth for transferring high priority, high bandwidth, real time traffic is available. The acceptance of the service request means that the wireless bearer is set up for the MTC device 800. The CTS message 807 is further sent to the MTC device 800 via the wireless bearer. Upon receiving the CTS message 807, the MTC device 800 can send the U plane traffic to the MTC server 802 using the appropriate bearer. The U plane traffic transmission to the MTC server 802 is shown by a message 811.

In the case where the AvGrBW is 0, the network 801 may send the paging message without waiting for the CTS message 807. In another derivative application example, the MTC device 800 may send the warning message about the emergency traffic, by embedding such a trigger in the service request message 803. In the case where the AvGrBW is 0, after the warning message in which the service request 803 is embedded is processed, the control plane message is sent to the MTC server 802.

Although the present invention is described by way of the embodiments that are considered as most practical and preferred, a person skilled in the art will understand that various derivative examples exist for detailed designs and parameters without departing from the scope of the present invention.

Each functional block used in the description of the above embodiments of the present invention is typically implemented as LSI (Large Scale Integration) which is an integrated circuit. Each of the functional blocks may separately be implemented on one chip, or all or part of the functional blocks may be implemented on one chip. Though LSI is mentioned as the integrated circuit here, the integrated circuit may be called any of an IC (Integrated Circuit), system LSI, super LSI, or ultra LSI depending on the degree of integration.

Moreover, the integrated circuit method is not limited to LSI, and may be realized by a dedicated circuit or a general-purpose processor. A FPGA (Field Programmable Gate Array) that can be programmed after LSI manufacturing or a reconfigurable processor capable of reconfiguring connections and settings of circuit cells inside LSI may also be used.

Furthermore, when an integrated circuit technology that replaces LSI emerges from advancement of semiconductor technologies or other derivative technologies, such a technology can be used for the functional block integration. For instance, biotechnology may potentially be adapted in this way.

INDUSTRIAL APPLICABILITY

The present invention relates to a communication technique in a packet exchange type data communication network. The present invention is especially applicable to a technique in the case where a bandwidth upper limit of a group (group bandwidth upper limit) is set in group-based communication. The present invention is also especially applicable to a technique of machine-to-machine communication and machine type communication.

The invention claimed is:

1. A communication device in a system in which a plurality of communication devices communicate with a communication server via a network and a sum total of communication bit rates assigned to the plurality of communication devices is not to exceed a predetermined upper limit, the communication device comprising a processor having one or more integrated circuits configured to:
    determine whether or not to send high priority and high bit rate traffic to the communication server;
    send to the network a service request for sending the high priority and high bit rate traffic, in the case where the high priority and high bit rate traffic is determined to be sent;
    receive from the network a service request response that is a response to the service request and includes a bearer identifier of a bearer via which the high priority and high bit rate traffic is unable to be sent;

send to the communication server a traffic sending request for the high priority and high bit rate traffic via the bearer identified by the bearer identifier;

receive from the communication server a sending request response that is a response to the traffic sending request and includes information indicating whether or not the high priority and high bit rate traffic is able to be sent; and send the high priority and high bit rate traffic to the communication server, in the case where the high priority and high bit rate traffic is determined to be able to be sent from the sending request response, wherein the communication device is one of the plurality of communication devices.

2. The communication device according to claim 1, wherein the bearer identifier included in the service request response identifies a bearer having a minimum bandwidth, and wherein the traffic sending request is sent from the communication device to the communication server via the bearer having the minimum bandwidth identified by the bearer identifier.

3. The communication device according to claim 1, wherein the bearer identifier included in the service request response identifies a default bearer, and wherein the traffic sending request is sent from the communication device to the communication server via the default bearer identified by the bearer identifier.

4. The communication device according to claim 1, further performing, in the case where the high priority and high bit rate traffic is determined to be able to be sent from the sending request response, a procedure of modifying a bandwidth of the bearer identified by the bearer identifier so that the high priority and high bit rate traffic is able to be sent from the communication device to the communication server via the bearer identified by the bearer identifier, wherein the high priority and high bit rate traffic is sent from the communication device to the communication server, via the bearer identified by the bearer identifier and having the modified bandwidth.

5. The communication device according to claim 1, further sending the traffic sending request for the high priority and high bit rate traffic to the communication server using a message of any of a user plane and a control plane.

6. The communication device according to claim 1, wherein the communication device is a mobile terminal.

7. The communication device according to claim 1, wherein the communication device is part of a system in which a plurality of communication devices communicate with a communication server via a network and a sum total of communication bit rates assigned to the plurality of communication devices is not to exceed a predetermined upper limit.

8. A network node included in a network in a system in which a plurality of communication devices communicate with a communication server via the network and a sum total of communication bit rates of the plurality of communication devices communicating with the communication server is not to exceed a predetermined upper limit, the network node comprising a processor having one or more integrated circuits configured to:

receive from a communication device among the plurality of communication devices that determines to send high priority and high bit rate traffic, a service request for sending the high priority and high bit rate traffic; and send to the communication device a service request response including a bearer identifier of a bearer via which the high priority and high bit rate traffic is unable to be sent, as a response to the service request, check whether or not the sum total of the bit rates in the system exceeds the predetermined upper limit if the sending of the high priority and high bit rate traffic is allowed; and send to the communication device a service request response including a bearer identifier of a bearer via which the high priority and high bit rate traffic is able to be sent, in the case where the upper limit excess check unit determines that the sum total does not exceed the predetermined upper limit, wherein the response to the service request is sent to the communication device as the service request response including the bearer identifier of the bearer via which the high priority and high bit rate traffic is unable to be sent, only in the case where the upper limit excess check unit determines that the sum total exceeds the predetermined upper limit.

9. The network node according to claim 8, further executing with another network node in the network, a procedure of setting the bearer via which the communication device is to send a traffic sending request for the high priority and high bit rate traffic to the communication server, when the sum total exceeds the predetermined upper limit, wherein the service request response is sent to the communication device including the bearer identifier of the bearer set by the bearer setting unit, as the response to the service request.

10. The network node according to claim 8, wherein the bearer identifier included in the service request response identifies a bearer having a minimum bandwidth.

11. The network node according to claim 8, wherein the bearer identifier included in the service request response identifies a default bearer.

* * * * *